(12) United States Patent
Ide et al.

(10) Patent No.: US 8,083,361 B2
(45) Date of Patent: Dec. 27, 2011

(54) OPTICAL SWITCH CONTROLLER AND MOVABLE BODY CONTROLLER

(75) Inventors: Satoshi Ide, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/654,430

(22) Filed: Dec. 18, 2009

(65) Prior Publication Data

US 2010/0103493 A1    Apr. 29, 2010

Related U.S. Application Data

(62) Division of application No. 11/819,145, filed on Jun. 25, 2007, now Pat. No. 7,670,015, which is a division of application No. 10/911,626, filed on Aug. 5, 2004, now abandoned.

(30) Foreign Application Priority Data

Sep. 3, 2003 (JP) ................................ 2003-311704
Mar. 31, 2004 (JP) ................................ 2004-107982

(51) Int. Cl.
G02B 7/182 (2006.01)
G02B 26/00 (2006.01)
G02B 26/08 (2006.01)
(52) U.S. Cl. ...................... 359/877; 359/224.1; 359/290
(58) Field of Classification Search .................. 359/877, 359/224.1, 290
See application file for complete search history.

(56) References Cited

U.S. PATENT DOCUMENTS

| | | | | |
|---|---|---|---|---|
| 4,047,792 A | * | 9/1977 | Dale, Jr. et al. | 359/198.1 |
| 4,267,494 A | * | 5/1981 | Matsuoka et al. | 318/568.1 |
| 4,975,626 A | * | 12/1990 | Yagi et al. | 318/567 |
| 5,428,473 A | | 6/1995 | Takizawa et al. | |
| 5,835,291 A | * | 11/1998 | Takayama | 359/843 |
| 6,043,736 A | | 3/2000 | Sawahata et al. | |
| 6,259,548 B1 | | 7/2001 | Tsugai et al. | |
| 6,333,572 B1 | | 12/2001 | Ono | |

(Continued)

FOREIGN PATENT DOCUMENTS

JP            4-289527            10/1992

(Continued)

OTHER PUBLICATIONS

A. Ishizuka, et al., "High-Speed 3-Dimensional MEMS Optical Switch," Society Conference of the Institute of Electronics, Information and Communication Engineers (2002), p. 447, English translation (4 pgs.), (total of 5 pgs.).

(Continued)

*Primary Examiner* — William Choi
(74) *Attorney, Agent, or Firm* — Staas & Halsey LLP

(57) ABSTRACT

In an optical switch controller, in order that residual vibration at movement control of a movable body such as a tilt mirror can be reduced and controlled with high accuracy, a processing unit outputs a driving signal for controlling the angle of the tilt mirror, the driving signal is D/A converted by a D/A converter and then is changed to a high-voltage signal by a high-voltage amplifier to be supplied to the tilt mirror, the electrostatic capacity of the tilt mirror changes corresponding to angle change of the tilt mirror, a mirror-angle detecting unit detects the electrostatic capacity and feeds back it as a correction value to a processing unit, and the processing unit corrects the driving signal using a correction value obtained when the angle of the tilt mirror is actually changed.

6 Claims, 21 Drawing Sheets

U.S. PATENT DOCUMENTS

| | | | |
|---|---|---|---|
| 6,464,363 | B1 | 10/2002 | Nishioka et al. |
| 7,670,015 | B2 | 3/2010 | Ide et al. |
| 2003/0081882 | A1 | 5/2003 | Yamashita et al. |
| 2003/0094914 | A1 | 5/2003 | Yanagita et al. |
| 2003/0214738 | A1* | 11/2003 | Yamada et al. .............. 359/877 |
| 2003/0227538 | A1* | 12/2003 | Fujii et al. .................... 347/260 |
| 2006/0049826 | A1* | 3/2006 | Daneman et al. ....... 324/207.13 |

FOREIGN PATENT DOCUMENTS

| | | |
|---|---|---|
| JP | 8-105748 | 4/1996 |
| JP | 8-211320 | 8/1996 |
| JP | 8-278336 | 10/1996 |
| JP | 2001-289607 | 10/2001 |

OTHER PUBLICATIONS

I. Brener, et al., "Nonlinear Servo Control of MEMS Mirrors and Their Performance in a Large Port-Count Optical Switch", Optical Fiber Communication Conference, vol. 1 (2003), pp. 385-386.

Japanese Office Action issued Jul. 7, 2009 in corresponding Japanese Patent Application No. 2004-107982.

U.S. Appl. No. 11/819,145, filed Jun. 25, 2007, Satoshi Ide, et al., Fujitsu Limited.

U.S. Appl. No. 10/911,626, filed Aug. 5, 2004, Satoshi Ide, et al., Fujitsu Limited.

USPTO Office Action issued in U.S. Appl. No. 11/819,145 mailed Dec. 16, 2008.

USPTO Office Action issued in U.S. Appl. No. 11/819,145 mailed May 15, 2009.

USPTO Office Action issued in U.S. Appl. No. 11/819,145 mailed Aug. 24, 2009.

USPTO Requirement for Restriction/Election mailed on Nov. 7, 2005, in U.S. Appl. No. 10/911,626.

USPTO Office Action mailed Feb. 7, 2006 in U.S. Appl. No. 10/911,626.

USPTO Office Action mailed Jul. 27, 2006 in U.S. Appl. No. 10/911,626.

USPTO Office Action mailed Nov. 14, 2006 in U.S. Appl. No. 10/911,626.

USPTO Office Action mailed Jan. 23, 2007 in U.S. Appl. No. 10/911,626.

USPTO Notice of Allowance and Fee issued in U.S. Appl. No. 11/819,145 mailed Sep. 18, 2009.

Japanese Patent Office Notice of Reasons for Rejection mailed Apr. 6, 2010, for corresponding Japanese Patent Application No. 2004-107982.

* cited by examiner

FIG. 16

| OPTICAL PATH NUMBER | INPUT WAVELENGTH NUMBER | OUTPUT WAVELENGTH NUMBER | X-AXIS CONTROL ANGLE | | Y-AXIS CONTROL ANGLE | |
|---|---|---|---|---|---|---|
| | | | X1 | X2 | Y1 | Y2 |
| 1 | 1 | 3 | 0.1 | 0.3 | 0.5 | 1.2 |
| 2 | 1 | 6 | 0.9 | 0.8 | 0.1 | 0.3 |
| ... | | | ... | ... | ... | ... |
| n | 2 | 1 | 0.09 | 0.9 | 0.4 | 0.5 |

45

OPTICAL SWITCH CONTROLLER AND MOVABLE BODY CONTROLLER

CROSS-REFERENCE TO RELATED APPLICATIONS

This application is a divisional of U.S. patent application Ser. No. 11/819,145, filed Jun. 25, 2007 now U.S. Pat. No. 7,670,015, which is also a divisional of U.S. patent application Ser. No. 10/911,626filed Aug. 5, 2004, now abandoned, which claims the benefit of Japanese Application No. 2004-107982, filed Mar. 31, 2004 and Japanese Application No. 2003-311704, filed Sep. 3, 2003, in the Japanese Patent Office, the disclosures of all of which are incorporated herein by reference.

BACKGROUND OF THE INVENTION

1. Field of the Invention

The present invention relates to a controller for controlling the movement of a movable body such as a mirror of an optical switch composed of a tilt mirror for which a MEMS technique is used; and more particularly to an optical switch controller and a movable body controller capable of reducing residual vibration at movement control of the movable body and performing the movement control accurately.

2. Description of the Related Art

Recently, traffic has been significantly increasing with rapid spread of the Internet. A wavelength division multiplexing (WDM) system is available as a system to construct a large capacity optical communication network dealing with the increase of traffic. A basic optical network constructed with a WDM system is provided with an optical cross-connect (OXC) system and an optical add/drop module (optical add/drop multiplexer (OADM)). An optical node constituted by an optical cross-connect system and an optical add/drop module uses an optical switch such as a tilt mirror to which a micro-electromechanical system (MEMS) technology is applied.

A tilt mirror to which a MEMS technique is applied is constituted by a micro mirror structure and an electrical circuit integrated with each other, and allows light inputted from a plurality of ports to output from given ports by switching ports. The port switching allows optical exchange for switching optical signals of a plurality of systems on optical transmission lines to different systems.

FIG. 24 shows the structure of an optical switch. This drawing shows a side view of a tilt mirror constituted as an optical switch by applying a MEMS technique. In the tilt mirror 120 shown in the drawing, a mirror 121 a surface of which is a reflecting surface is capable of swinging, in the directions shown by arrows in the drawing, with the center axis 122 as the center. Swing operation of the mirror 121 switches outgoing angles of incident light A to given angles (a1, a2, and a3 directions) in both directions with reference to the horizontal level in order to allow the incident light to output at the given angles. The notational denotes the minus angle region, and the notation a3 denotes the plus angle region. The tilt mirror 120 is provided with electrodes formed like the teeth of a comb when viewed from the plane, thus being a MEMS mirror, shaped like the teeth of a comb, in which the angle of the mirror 121 can be changed in all angle directions continuously, which is not illustrated. A technique related to such a three-dimensional MEMS optical switch is disclosed in, for example, non-patent document 1 described below.

The mirror 121 provided in the tilt mirror 120 is electrically grounded (GND), and one end of the mirror 121 faces a plus driving electrode 123a, and another end of it faces a minus electrode 123b. The tilt mirror 120 has electrostatic capacity Ca between the mirror 121 and the plus driving electrode 123a, and electrostatic capacity Cb between the mirror 121 and the minus driving electrode 123b. When a driving voltage on a plus driving electrode or a minus driving electrode are supplied to the tilt mirror 120, the angle of the mirror 121 can be changed continuously depending on values of the driving voltages, around the indrive position where the driving voltages are 0 V. When the angle of the mirror 121 is changed continuously, values of the electrostatic capacities Ca and Cb change continuously correspondingly to the angle change. The angle of the mirror 121 is controlled by a driving unit.

FIG. 25 is a block diagram showing a conventional driving unit for an optical switch. An input signal corresponding to an angle for changing the angle of the tilt mirror 120 through the digital filter 130 is D/A converted by the D/A converter, and then is amplified to high voltage by the high-voltage amplifier 132 and is supplied to the tilt mirror 120 to drive it. The digital filter 130 is a band elimination filter (BEF) for limiting gains near the resonance frequency element of the input signal in order to reduce the self-resonance phenomenon of the mirror 121. This BEF is constituted by an FPGA, a DSP, etc. The driving unit shown in FIG. 25 is of a constitution of a feed-forward control system outputting a driving voltage on the basis of an input signal, and is able to continuously change the angle of the mirror 121 corresponding to values of driving voltages output by supplying input signals corresponding to variations of the angle.

Next, a large-scale optical switch composed of a tilt mirror to which a MEMS technology is applied will be described.

As described above, in recent years, data traffic in various networks has been increasing explosively, and it has been developed to construct a photonic network capable of processing a large amount of data traffic. Furthermore, it is expected that various networks and photonic networks would develop in a mesh configuration in the near future. In order to operate a mesh-like photonic network with flexibility, nodes of the network need a function of exchanging (cross-connecting) desired paths (routes). Realization of a large-scale optical cross-connect requires exchange of paths whose number is decided by connection nodes (e.g., 10 nodes)×wavelength (e.g., 40 waves), and requires, for this purpose, a large-scale optical switch up to hundreds to thousands. For this large scale cross-connecting function, an optical switch to which a 3D-MEMS technology is applied is most suitable.

FIG. 21A is a block diagram of a conventional optical switch controller (3D-MEM switch controller). The controller 47a shown in FIG. 21A sets voltage data to the angle of the mirror on the basis of a tilt-angle setting table which defines correspondences between angles)(θ°) of the mirror (MEMS mirror 33) and voltage data (V) representing a driving voltage. The voltage data is given to the D/A converter 12 and the MEMS driver 15a to drive the mirror. Concurrently with driving the mirror angle feedback control using an angle sensor is performed, and the controller 47a performs PID control on the basis of the angle data fed back to perform correction of deviation of the driving voltage, suppression of the mirror resonance phenomena, etc. The mirror, which has been set at a predetermined angle, deflects and switches signal light input from an optical fiber.

A technique relative to this angle feedback control has also been proposed (see non-patent document 1).

For angle detection using an angle sensor, an electrostatic capacity sensor (amplifier-type capacity sensor 47b), for example, is used. In this electrostatic capacity sensor, the amplification factor of a detection signal changes depending on the tilt of the mirror on the basis of variations of electrostatic capacities caused by the tilt of the mirror and the operation of driving electrodes depending on the tilt of the mirror. That is, the amplitude of the detection signal increases or decreases with the tilt of the mirror. Since the detection signal output from this electrostatic capacity sensor is an analog signal, the detection signal is converted to a digital signal through a sample-and-hold circuit 47c and an A/D converter 12a to perform digital control.

As described above, when a large-scale optical cross-connecting device is realized using a 3D-MEMS optical switch, necessary number of optical switch controllers is hundreds to thousands as an example.

In response to this large-scale need, techniques of integrating angle sensors (electrostatic capacity sensors) on a MEMS chip and the like have been developing.

Non-patent document 1: "High-speed Switching Three-dimensional MEMS Optical switch" Communication Society Conf. of Electronic Information Communication Institute, pp. 447, 2002

Non-patent document 2: Brener et al. "Nonlinear Servo Control of MEMS Mirrors and Their Performance in a Large Port-Court Optical Switch", Optical Fiber Communication Conf. 2003, Atlanta, Ga., 2003.

However, residual vibration (amplitude) occurs on the tilt mirror 120 due to the self-resonance phenomenon of the mirror 121 when the mirror 121 is tilted to a desired angle δ. The tilt mirror 120 has electrostatic capacities as described above. The equation of motion of the tilt mirror 120 is shown as equation (1) in which I is the moment of inertia, c is the attenuation coefficient, k is the spring constant, C is the electrostatic capacity of the tilt mirror, and V is the driving voltage.

$$I\theta'' + c\theta' + k\theta = \frac{1}{2}\frac{\partial C}{\partial \theta}V^2 \quad (1)$$

Like this, the ultimate angle of the tilt mirror changes corresponding to variations of the electrostatic capacity of the tilt mirror. FIG. 26 is a graph showing the characteristic between the electrostatic capacity of the mirror and the rotational angle. The horizontal axis indicates the rotational angle θ, and the vertical axis indicates the electrostatic capacity C. As shown in the figure, the mirror 121 has a characteristic that the electrostatic capacity is proportional to the rotational angle (linearity) in the plus angle region (tilts shown with a solid line in FIG. 24), and is not proportional to the rotational angle (nonlinearity) in the minus angle region (tilts shown with a dotted line in FIG. 24), with the boundary where the mirror is in a horizontal position)(0°). Furthermore, since the mirror 121's own Q value is large, residual vibration occurs due to the self-resonance phenomenon. Because of this, a continuous feedforward control system using the driving unit described above has a problem that the residual vibration can not be restricted when the angle of the mirror is changed particularly to a minus angle. An optical switch composed of such a tilt mirror reduces the accuracy and response speed of angle control in changeover of optical paths of optical transmission lines.

In this configuration, in the feedforward control system using the driving unit described above, the Q value needs to be reduced in order to restrict the self-resonance phenomenon of the mirror 121. When the Q value is reduced, the residual vibration caused by the self-resonance phenomenon can be reduced, but the response speed of angle control of the mirror 121 is reduced. By increasing the Q value, the response speed of the angle control can be increased, but the residual vibration caused by the self-resonance phenomenon of the mirror 121 deteriorates (increases).

Like this, in order to restrict the self-resonance phenomenon of the mirror 121, it is necessary to optimize the parameters of the digital filter 130 and improve the slew rate, etc. of the high-voltage amplifier which affect the angle response control of the mirror 121, but these require much time and labor in adjustment, and can not eliminate the self-resonance phenomenon arising at angle change, and increase the response speed. A tilt mirror is taken as an example in the above description, but the same problem arises also when controlling, in the same way, the movement of a micro movable body using a MEMS technology, etc.

Furthermore, the A/D converter 12a provided in the optical switch controller shown in FIG. 21A is large in circuit scale and power consumption in general, and has a characteristic of being weak against crosstalk between channels, and the like because it is an analog circuit, thereby being a bottleneck in realization of a large-scale optical cross-connecting device. The reason is that since the angle sensor is an analog circuit, complex analog processing such as A/D conversion is required, and thereby a large-scale optical switch can not be realized.

Conventionally, it results a large-scale circuit that an IC (Integrated Circuit) containing hundreds of A/D converters is mounted on a board or substrate for the purpose of realization of a large-scale switch, and it requires a large chip area that the A/D converters are integrated in a controller IC or a controller LSI (Large Scale Integration) for the same purpose, and therefore there is a problem that it is impossible to realize a large-scale switch.

SUMMARY OF THE INVENTION

In order to solve the above-mentioned problem in the conventional technology, and it is an object of the present invention to provide an optical switch controller and movable body controller capable of reducing the residual vibration of a movable body such as a tilt mirror caused when the movement of the movable body is controlled, and performing high-accurate control.

The second invention is to provide an optical switch controller which allows circuit scale reduction and circuit integration by performing only digital signal processing without performing any analog signal processing by A/D converters, etc., thus allowing a large scale optical switch.

In order to solve the above mentioned problem and achieve the above objects, an optical switch controller according to the present invention is an optical switch controller performing angle control of a mirror upon using electrostatic capacity changed corresponding to angular positions, comprising: electrostatic capacity detection means for detecting the electrostatic capacity of said mirror; and processing means for correcting a driving signal to change the angular position of said mirror at the time of angular position change, on the basis of the electrostatic capacity detected by said electrostatic capacity detection means.

According to the optical switch controller of the present invention, the electrostatic capacity detection means detects the electrostatic capacity caused when the angle of the mirror is controlled, and the processing means corrects the driving signal on the basis of the electrostatic capacity fed back, so that the driving signal can be corrected corresponding to actual angular positions of the mirror, and high-accurate angle control can be performed.

Furthermore, a movable body controller according to the present invention is a movable body controller performing movement control of a movable body upon using electrostatic capacity changed corresponding to moving positions, comprising: electrostatic capacity detection means for detecting the electrostatic capacity of said movable body; and processing means for correcting a driving signal to change moving positions of the movable body at the time of moving position change, on the basis of the electrostatic capacity detected by the electrostatic capacity detection means.

According to the movable body controller of the present invention, the electrostatic capacity detection means detects the electrostatic capacity caused when the movement of the movable body is controlled, and the processing means corrects the driving signal on the basis of the electrostatic capacity fed back, so that the driving signal can be corrected depending on actual amounts of movements of the movable body, and correct and high-accurate movement control can be performed.

Furthermore, an optical switch controller according to the present invention is an optical switch controller performing angle control of a mirror, comprising: a mirror angle sensor for outputting a periodic signal changing depending on angular positions of said mirror; a signal period detector for detecting the period of the periodic signal outputted from said mirror angle sensor; and a controller for controlling the angular position of said mirror on the basis of the period detected by said signal period detector.

According to the optical switch controller of the present invention, analog signal processing of, for example, an A/D converter, a D/A converter, etc. becomes unnecessary, and all processing become digital signal processing. Thus, circuit scale reduction and circuit integration become possible, and the capacity of an optical switch can be significantly increased.

Furthermore, said signal period detector may comprises: a multi-value state holding unit for holding a multi-value state by a periodic signal output from said mirror angle sensor; and a state detecting unit for detecting variations of the multi-value state of said multi-value state holding unit by using a system clock faster than said periodic signal.

In such configuration, a signal synchronizing with the system clock is used, so that processing in the controller IC becomes easy, and realizing a large-scale and high-speed circuit can be promoted. Furthermore, the optical switch controller can be realized using a general-purpose digital circuit (gate array, field programmable gate array (FPGA), or the like), and thereby the cost of it can be reduced.

According to the optical switch controller of the present invention, the electrostatic capacity caused at angle control of the mirror is detected, and the electrostatic capacity is fed back to correct the driving signal provided when the angular position of the mirror is changed, so that high-accurate angle control corresponding to actual angular positions of the mirror can be performed.

Furthermore, according to the movable body controller of the present invention, the electrostatic capacity caused at the movement of the movable body such as a mirror is detected, and the electrostatic capacity is fed back to correct the driving signal provided when the moving position of the movable body is changed, so that high-accurate movement control corresponding to actual movement conditions of the movable body can be performed. In particular, residual vibration caused by the self-resonance can be prevented by performing feedback control of the tilt of the movable body such as a mirror is performed so that the tilt of the movable body such as a mirror does not become a predetermined angle (capacity causing the self-resonance).

Furthermore, according to the optical switch controller of the present invention, all angle feedback processing using an angle sensor can be digitized. In addition, it becomes possible that the function of high-speed digital frequency detection is integrated on a single controller IC, and thereby both of the circuit scale and mounting area can be significantly reduced.

Furthermore, the optical switch controller of the present invention uses a signal synchronizing with the system clock, so that processing in the controller IC is easy and the controller is suitable to realize a large-scale and high-speed circuit.

The optical switch controller and movable body controller of the present invention are useful in accurately and directly controlling a movable body such as a mirror having a minute structure such as a MEMS, and is particularly suitable for an optical switch for switching optical paths, in optical cross-connect system using WDM signals to continuous given angles with a low optical loss at high speed.

According to the optical switch controller of the present invention, the scale of a control circuit performing mirror angle detection and feedback control can be reduced, and thereby the size of a control circuit for large scale switching of hundreds to thousands of switches can be reduced.

BRIEF DESCRIPTION OF THE DRAWINGS

FIG. 16 shows an example of a tilt-angle setting table of the controller in embodiment 4.

DETAILED DESCRIPTION OF THE PREFERRED EMBODIMENTS

Preferred embodiments of an optical switch controller and a movable body controller according to the present invention are described in detail below with reference to the accompanying drawings. In the following description, an optical switch whose moving unit to be controlled is a tilt mirror is taken as an example.

Embodiment 1

Figure 1:
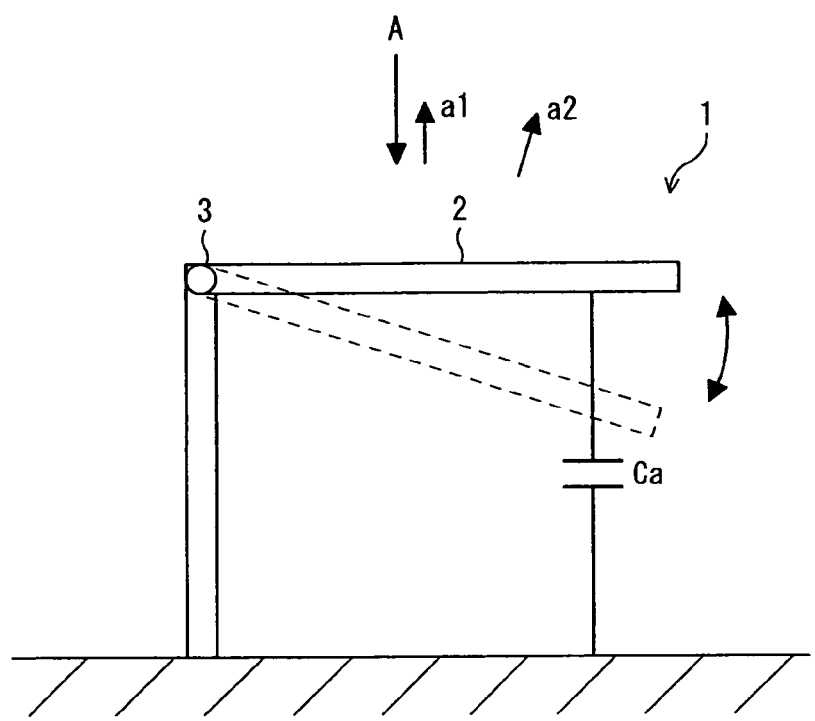
FIG. 1 is a view showing the structure of an optical switch used in embodiment 1 of the present invention.

At first, embodiment 1 of an optical switch according to the present invention will be described. FIG. 1 shows the structure of an optical switch used in embodiment 1 of the present invention. This drawing shows a side view of a tilt mirror which is configured as an optical switch to which a MEMS technique is applied. In the tilt mirror 1 shown in the drawing, a mirror 2 a surface of which is a reflecting surface is able to swing with the axis 3 as the center. The angle of the mirror 2 in the horizontal state is 0°, and the position shown with dotted lines in the drawing is in the swinging direction of the mirror. By the swinging of the mirror 2, outgoing angles of incident light A are switched to given angles (a1 direction, a2 direction, or the like) to allow the incident light to output at the given angles. The mirror 2 swings only in the positive angle region shown in FIG. 26, where the rotational angle of the mirror 2 is proportional to (changes linearly with) the electrostatic capacity of it.

Figure 2:
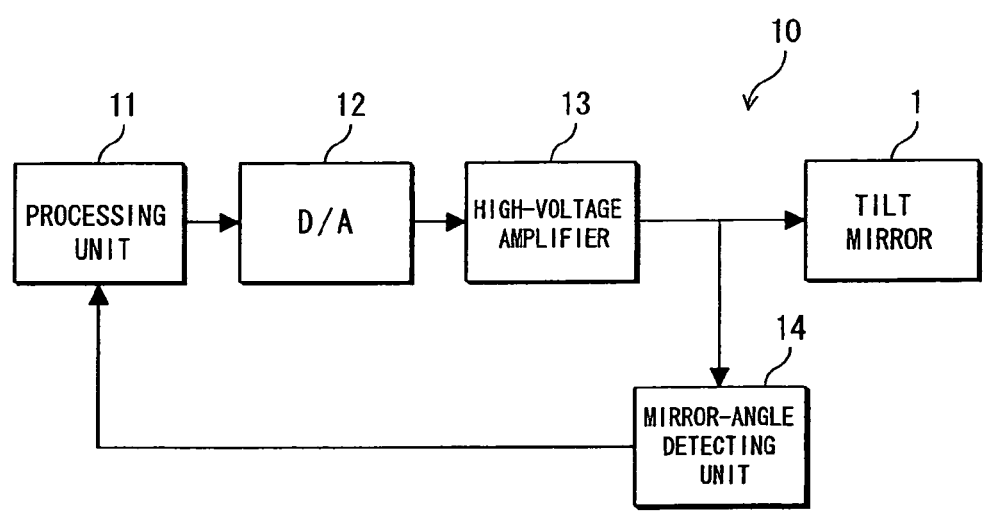
FIG. 2 is a block diagram showing the configuration of a driving unit for the optical switch according to embodiment 1.

FIG. 2 is a block diagram showing the configuration of a driving unit for the optical switch in embodiment 1. The driving unit 10 is composed of a processing unit 11, a D/A converter 12, a high-voltage amplifier 13, and a mirror-angle detecting unit 14. The processing unit 11 outputs a driving signal corresponding to an angle to switch the angle of the tilt mirror 1. The processing unit 11 is composed of a CPU and an angle control program, or consists of an FPGA, a DSP, etc. A driving signal output from the processing unit 11 is D/A converted by the D/A converter 12, and is then changed to a high-voltage driving signal capable of driving the tilt mirror by the high-voltage amplifier 13 to be provided for the tilt mirror.

The mirror-angle detecting unit 14 detects the angle of the mirror 2 operated on the basis of a driving signal output by the high-voltage amplifier 13. The mirror-angle detecting unit 14 does not directly detect the angle of the mirror 2. The mirror-angle detecting unit 14 detects the electrostatic capacity Ca (see FIG. 1) of the tilt mirror, and feeds back the value of this electrostatic capacity Ca as feedback amount to the processing unit 11. The processing unit 11 corrects the driving signal on the basis of the electrostatic capacity Ca fed back by feedback control, and outputs the corrected driving signal. Like this, the driving unit 10 is constituted as a feedback control system which corrects the driving signal to be output on the basis of the change of electrostatic capacity Ca of the mirror and outputs the corrected driving signal when the angle of the tilt mirror is changed.

Figure 3:
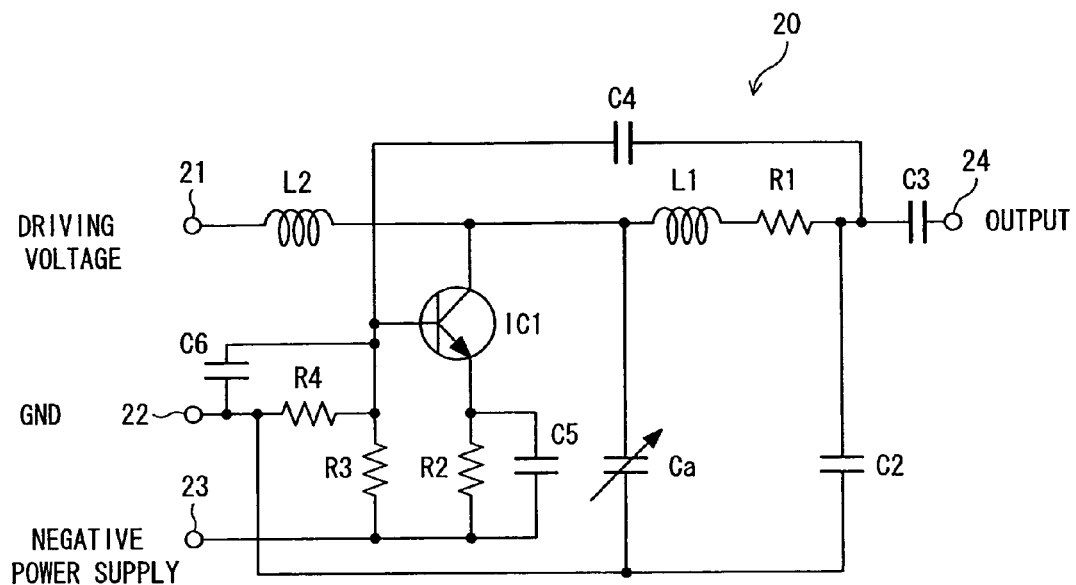
FIG. 3 is a circuit diagram showing a specific example of configuration of the mirror-angle detecting unit according to embodiment 1.

FIG. 3 is a circuit diagram showing a specific example of configuration of the mirror-angle detecting unit in embodiment 1. As shown in the drawing, the mirror-angle detecting unit 14 is composed of a Colpitts-type LC oscillating circuit 20. The driving voltage output from the high-voltage amplifier 13 is supplied to the collector of a transistor (TR) IC1 through an input terminal 21 and a coil L2. The emitter of the transistor IC1 is connected with a negative power supply through a parallel circuit of a resistor R2 and capacitor C5. The base of the transistor IC1 is connected with a grounding terminal (GND) 22 through a parallel circuit of a resistor R4 and capacitor C6, and is connected with a negative power supply terminal 23 through a resistor R3. Subsequent stage of the transistor IC1, a serial circuit of a coil L1 and resistor R1 is provided on a driving voltage line (output line), and an electrostatic capacity Ca described above is disposed, as an equivalent capacity variable capacitor Ca whose capacity is variable, between the driving voltage line and the grounding line. Subsequent stage of the coil L1 and resistor R1, a capacitor C2 is provided in parallel with the capacitor Ca. In addition, a capacitor C4 is connected between the base of the transistor IC1 and an output terminal 24 with which a capacitor C3 is connected in series. From the output terminal 24, a sinusoidal wave having a phase corresponding to the oscillation frequency is output.

In the above LC oscillating circuit 20, the value of the electrostatic capacity Ca changes with angle variations of the mirror 2, and the oscillation frequency of the output signal from the output terminal 24 changes accordingly. The oscillation frequency $f_{LC}$ of the LC oscillating circuit 20 is given by the following equation (2). Variable factors of the oscillation frequency $f_{LC}$ are the inductance $L_1$ of the coil L1, the electrostatic capacities Ca and Cb of the mirror, and the output admittance $h_{oe}$ and input impedance $h_{ie}$ of the transistor IC1.

$$f_{LC} = \frac{1}{2\pi}\sqrt{\frac{C_a + C_b}{L_1 C_a C_b} + \frac{h_{oe}}{C_a C_b h_{ie}}} \quad (2)$$

Since the mirror 2 resonates if the oscillation frequency of the LC oscillating circuit 20 is near the value of the tilt mirror 1's own self-resonance frequency, the oscillation frequency of the LC oscillating circuit 20 is set so as to be larger than the mirror 2's own resonance frequency. For example, when the mirror 2's own resonance frequency is 1.2 kHz, the oscillation frequency of the LC oscillating circuit 20 is set at the order of 100 times 1.2 kHz (10 MHz).

Figure 26:
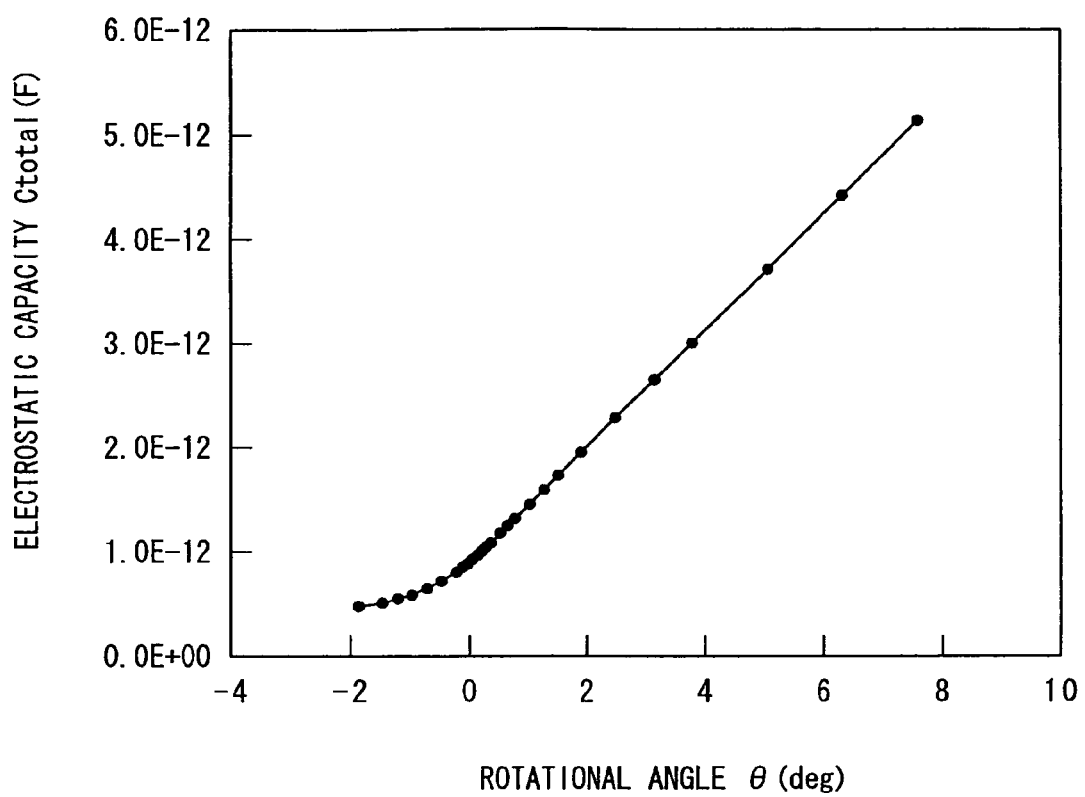
FIG. 26 is a graph showing the characteristic between the electrostatic capacity and the rotational angle of the mirror.

The output signal including frequency components output from the LC oscillating circuit 20 is fed back to the processing unit 11. The processing unit 11 detects the actual rotational angle of the mirror 2 on the basis of the frequency of this output signal (the phase of the sinusoidal wave). In this configuration, the processing unit 11 causes the CPU to execute the program to correct the rotational angle. For this purpose, a pulse converting unit (not shown) for converting a sinusoidal wave, outputted from the LC oscillating circuit 20, to pulses is provided between the LC oscillating circuit 20 and the processing unit 11. When the rotational angle θ shown in FIG. 26 is in the positive angle region, the electrostatic capacity C (Ca) corresponding to the rotational angle θ is proportional (linear) to the rotational angle θ, and thereby a correct rotational angle can be detected on the basis of the oscillation frequency. The processing unit 11 corrects the driving signal on the basis of the detected rotational angle, and outputs the corrected rotational angle to the D/A converter 12.

In this configuration, when the driving voltage is 0 V, the oscillation of the LC oscillating circuit 20 stops, and an output from the output terminal 24 can not be obtained. At that time, a predetermined voltage negative to the driving voltage is applied to the negative power supply terminal 23 to obtain an output when the driving voltage is 0 V.

According to embodiment 1 described above, the electrostatic capacity of the tilt mirror is detected, and the rotational angle of the tilt mirror can be obtained with high accuracy on the basis of variations of the electrostatic capacity. The obtained rotational angle is fed back to correct the driving signal, so that the rotational angle of the tilt mirror can be controlled with high accuracy as compared with a feedforward system.

Embodiment 2

Figure 24:
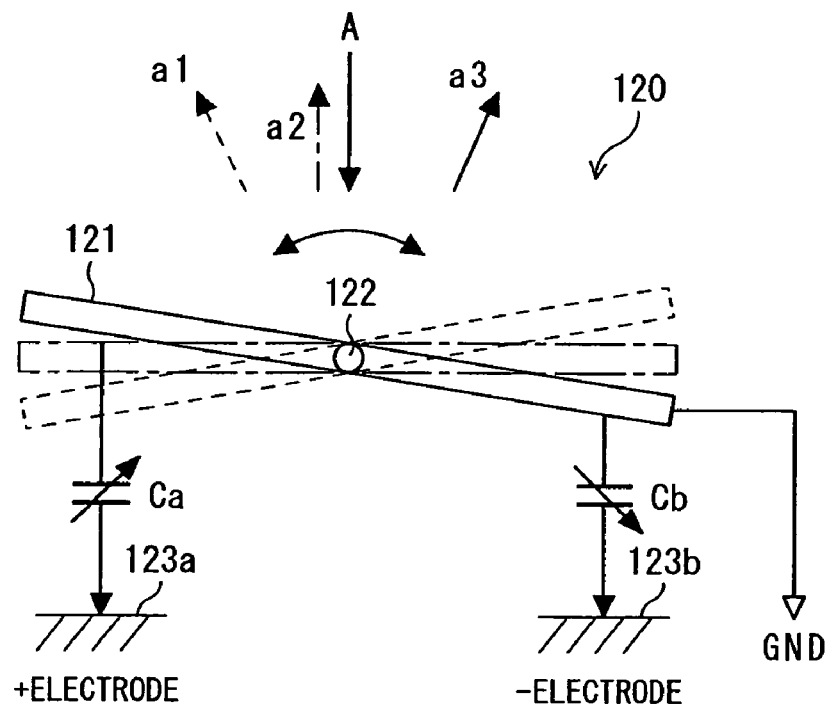
FIG. 24 shows the structure of an optical switch.
Figure 25:
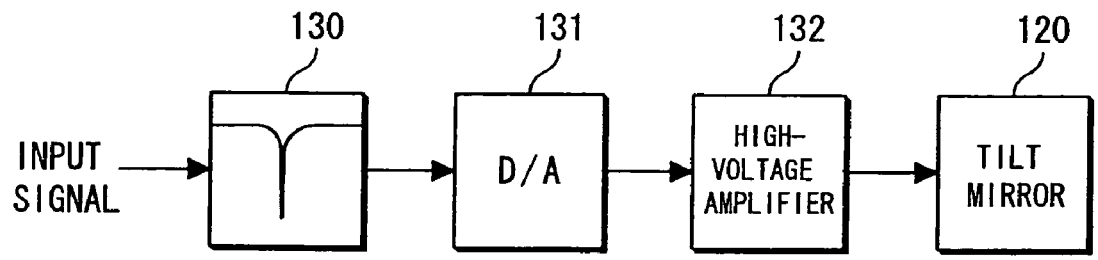
FIG. 25 is a block diagram showing a conventional driving unit for an optical switch.

Next, the optical switch of embodiment 2 of the present invention will be explained. The optical switch used in embodiment 2 has a structure as shown in FIG. 24 described above. In the tilt mirror 120 shown in the drawing, a mirror 2 a surface of which is a reflecting surface is able to swing with the center axis 3 as the center in the directions indicated by arrows shown in the drawing. The swinging of the mirror 2 switches the outgoing angle of incident light A to given angles (a1, a2, and a3 directions) in order to allow the incident light to output at the given angles.

Figure 4:
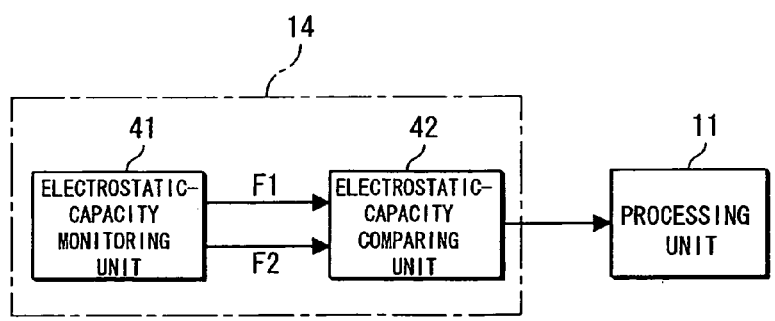
FIG. 4 is a block diagram showing the internal configuration of the mirror-angle detecting unit according to embodiment 2.

Embodiment 2 is different from embodiment 1 in configuration of the mirror-angle detecting unit 14. The configuration of a driving unit for the optical switch in embodiment 2 is nearly equal to that shown in FIG. 2, and explanation about it is omitted. FIG. 4 is a block diagram showing the internal configuration of the mirror-angle detecting unit in embodiment 2. The mirror-angle detecting unit in embodiment 2 is composed of an electrostatic capacity monitoring unit 41 functioning as an electrostatic capacity detection means for detecting the electrostatic capacity, and an electrostatic capacity comparing unit 42. The electrostatic capacity monitoring unit 41 detects electrostatic capacities Ca and Cb individually in the swinging directions a1 and a2 of the tilt mirror 120 respectively, and outputs driving signals F1 and F2 including frequency components corresponding to the electrostatic capacities Ca and Cb respectively. The electrostatic capacity comparing unit 42 compares the driving signals F1 and F2 to obtain the value of the deference between the frequencies, and then outputs this value to the processing unit 11 as a correction value. The processing unit 11 corrects the driving signal on the basis of the correction value obtained by the electrostatic capacity comparing unit 42, and outputs the corrected driving signal to the D/A converter 12 (see FIG. 2).

Figure 5:
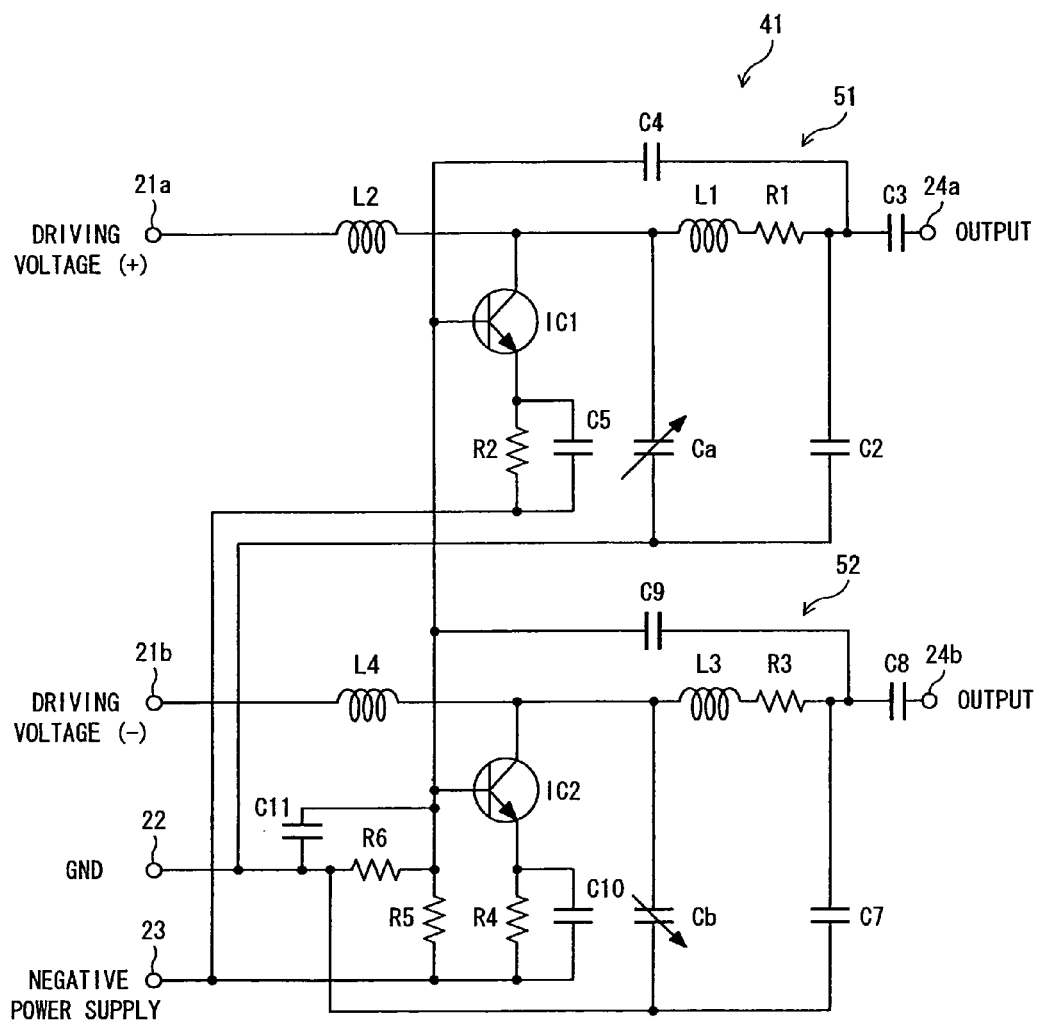
FIG. 5 is a circuit diagram showing a specific example of configuration of the electrostatic capacity monitoring unit.

FIG. 5 is a circuit diagram showing a specific example of configuration of the electrostatic capacity monitoring unit. As shown in the drawing, the electrostatic capacity monitoring unit 41 is composed of two Colpitts-type LC oscillating circuits 20 shown in FIG. 3 differentially connected with each other. As described above, angle changing control of the tilt mirror 120 can be performed in such a manner that a plus driving voltage and minus driving voltage are supplied at the same time, and the angle of the mirror 121 is controlled depending on values of the driving voltages. One of the LC oscillating circuits 51 detects the electrostatic capacity Ca between the positive driving electrode (+) and the tilt mirror 120 shown in FIG. 24, and the other LC oscillating circuit 52 detects the electrostatic capacity Cb for the minus driving electrode (−).

The configuration of the LC oscillating circuit 51 is described below. The driving voltage for the plus (+) electrode output from the high-voltage amplifier 13 (see FIG. 2) is supplied to the collector of a transistor (TR) IC1 through an input terminal 21a and a coil L2. The emitter of the transistor IC1 is connected with a negative power supply through a parallel circuit of a resistor R2 and capacitor C5. Subsequent stage of the transistor IC1, a serial circuit of a coil L1 and resistor R1 is provided on a driving voltage line (output line), and an electrostatic capacity Ca described above is disposed, as an equivalent capacity variable capacitor Ca whose capacity is variable, between the driving voltage line and the grounding line. Subsequent stage of the coil L1 and resistor R1, a capacitor C2 is provided in parallel with the capacitor Ca. In addition, a capacitor C4 is connected between the base of the transistor IC1 and an output terminal 24a with which a capacitor C3 is connected in series.

The configuration of the other LC oscillating circuit 52 is similar to that of the LC oscillating circuit 51. The driving voltage fot the minus (−) electrode output from the high-voltage amplifier 13 (see FIG. 2) is supplied to the collector of a transistor (TR) IC2 through an input terminal 21b and a coil L4. The emitter of the transistor IC2 is connected with a negative power supply through a parallel circuit of a resistor R4 and capacitor C10. Subsequent stage of the transistor IC2, a serial circuit of a coil L3 and resistor R3 is provided on a driving voltage line (output line), and an electrostatic capacity Cb described above is disposed, as an equivalent capacity variable capacitor Cb whose capacity is variable, between the driving voltage line and the grounding line. Subsequent stage of the coil L3 and resistor R3, a capacitor C7 is provided in parallel with the capacitor Cb. In addition, a capacitor C9 is connected between the base of the transistor IC2 and an output terminal 24b with which a capacitor C8 is connected in series.

The bases of the transistors IC1 and IC2 of the LC oscillating circuits 51 and 52 are both connected with a grounding terminal (GND) 22 through a parallel circuit of a resistor R6 and capacitor C11, and connected with a negative power supply terminal 23 through a resistor R5. Like this, the electrostatic capacity monitoring unit 41 is configured with a differential connection of the LC oscillating circuits 51 and 52. Because of this, changes in circuit constant caused by power supply variation, temperature variation, etc. can be eliminated, and outputs for high-accurate angle control can be obtained from the output terminals 24a and 24b. From these output terminals 24a and 24b, driving signals F1 and F2 including frequency components are output. The driving signals F1 and F2 outputted from the output terminals 24a and 24b are sinusoidal waves having phases corresponding to the oscillation frequencies. Subsequent stage of the LC oscillating circuits 51 and 52, a pulse converting unit (not shown) is provided for converting the sinusoidal waves which are driving signals F1 and F2 to pulses to output pulse-like driving signals F1 and F2 having phases corresponding to the frequencies to the subsequent electrostatic capacity comparing unit 42.

In this configuration, when the driving voltage of the LC oscillating circuits 51 and 52 is 0 V, the oscillation of the LC oscillating circuits 51 and 52 stops, and an output from the output terminals 24a and 24b can not be obtained. At that time, a predetermined voltage negative to the driving voltage are applied to the negative power supply terminal 23 to obtain an output when the driving voltage is 0 V.

Since the driving voltages are high-voltages of the order of 200V, high-voltage transistors are used for the transistors IC1 and IC2 of the LC oscillating circuits 51 and 52 respectively. The resistors R2 and R4 is set at a high value so as to reduce the current between the collector and emitter of the transistors IC1 and IC2 in order to reduce the power consumption of the LC oscillating circuits 51 and 52.

Next, the internal configuration of the electrostatic capacity comparing unit 42 will be described. To the electrostatic capacity comparing unit 42, the driving signals F1 and F2 outputted from the electrostatic capacity monitoring unit 41 provided front stage of it are input. The electrostatic capacity comparing unit 42 obtains the difference between frequencies included in the driving signals F1 and F2, and feeds back the difference to the processing unit as a correction value.

Figure 6:
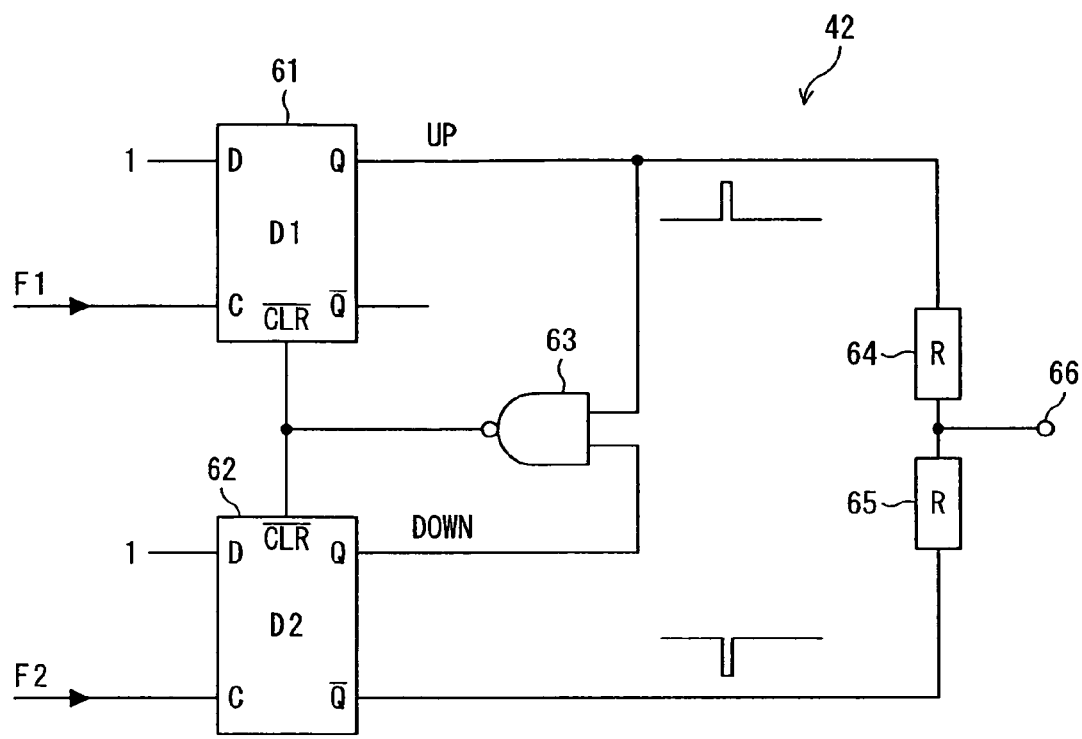
FIG. 6 is a circuit diagram showing a specific example of configuration of the electrostatic capacity comparing unit.

FIG. 6 is a circuit diagram showing a specific example of configuration of the electrostatic capacity comparing unit. This circuit shown in FIG. 6 is composed of logic circuit elements, which are two flip-flops (D-type F/F) 61 and 62, a non-disjunction (NAND) circuit 63, and resistors 64 and 65. A high-level signal [1] is supplied to each of the data input terminals of the D-type F/F 61 and 62, and driving signals F1 and F2 are supplied to the clock terminals respectively. The Q output of the D-type F/F 61 is connected with the output terminal 66 through the resistor 64, and the reverse Q output of the D-type F/F 62 is connected with the output terminal 66 through the resistor 65. Furthermore, Q outputs of the D-type F/F 61 and 62 are connected with clear terminals of the D-type F/F 61 and 62 respectively through the NAND circuit 63. In the figure, the D-type F/F 61 and 62 are indicated as D1 and D2 respectively.

Figure 7:
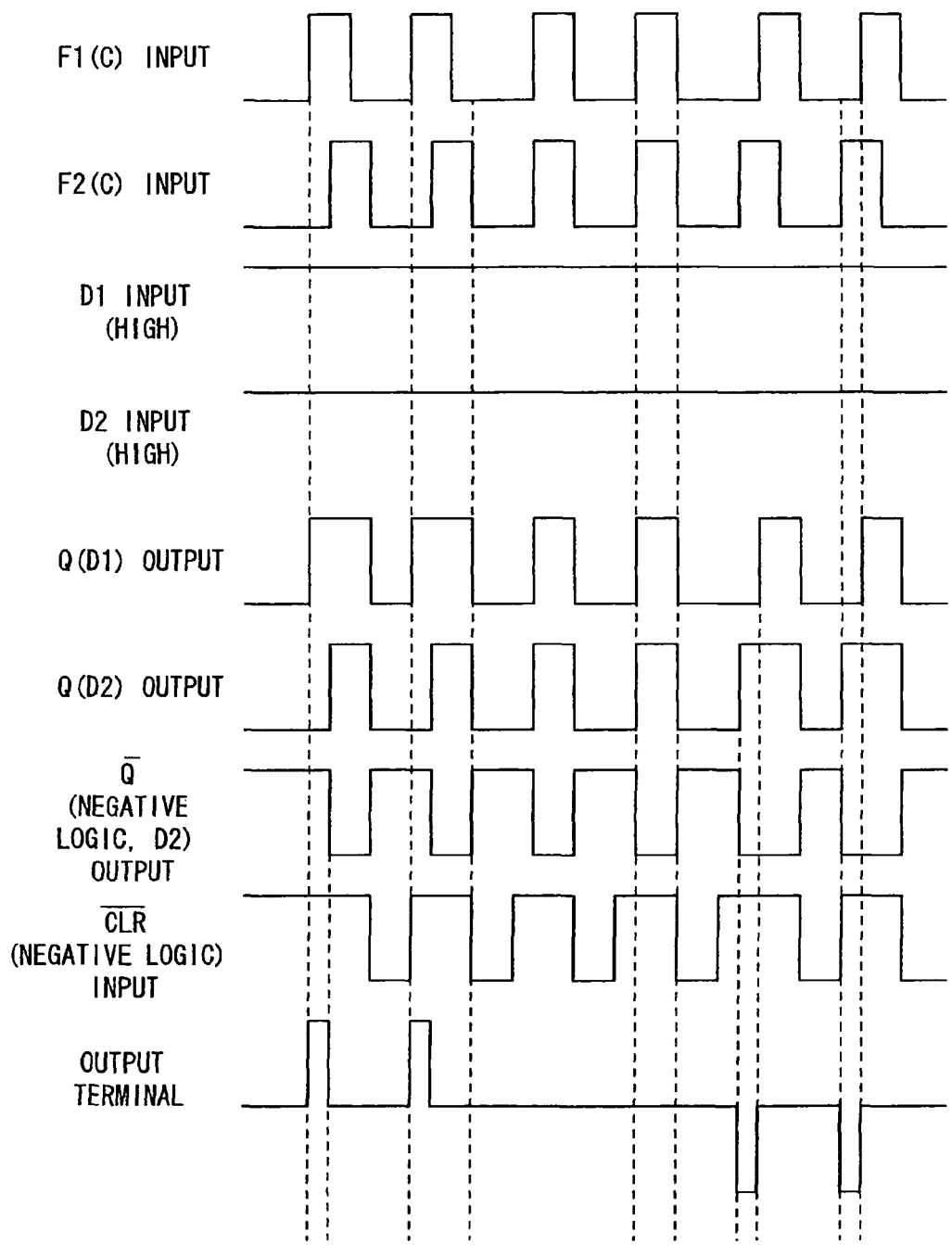
FIG. 7 is a time chart showing output waveforms of various parts in the electrostatic capacity comparing unit shown in FIG. 6.

FIG. 7 is a time chart showing waveforms of outputs of various parts in the electrostatic capacity comparing unit shown in FIG. 6. The driving signals F1 and F2 including frequency components detected by the electrostatic capacity monitoring unit 41 are input as clocks corresponding to their respective frequencies. The D-type F/F 61 and 62 holds data with timing of the leading edge of the driving signals F1 and F2, and outputs the held data from the Q terminal (reverse Q terminal). After that, when the outputs at Q terminals of these two D-type F/F 61 and 62 have become both low-level [0], data holding of the D-type F/F 61 and 62 are cleared. As described above, data holding and clearing are repeated. According to the above configuration, the D-type F/F 61 and 62 has a polarity corresponding to the phase lead or lag of the driving signals F1 and F2, and the width of a pulse output changes depending on the phase difference of the driving signals F1 and F2. These changes in pulse width are used to compare the frequencies included in the driving signals F1 and F2. The resistors 64 and 65 convert the sum of the Q output of the D-type F/F 61 and the reverse Q output of the D-type F/F 62 to a predetermined voltage value. The output terminal 66 outputs a pulse having a polarity corresponding to the phase lead or lag. The circuit configured as shown in FIG. 7 compares frequencies of the input driving signals F1 and F2 and outputs the difference between the frequencies as a voltage.

According to the above configuration, driving signals F1 and F2 corresponding to the angle of the mirror 121 (see FIG. 24) are output from the output terminals 24a and 24b of the LC oscillating circuits 51 and 52 respectively, and the electrostatic capacity comparing unit 42 shown in FIG. 6 obtains the difference between the driving signals F1 and F2 and outputs the difference from the output terminal 66. At that time, as shown in FIG. 26, when the angle of the mirror 121 is a plus angle around the rotational angle of 0°, the linear region is used in which the electrostatic capacity is proportional to the rotational angle. When the angle of the mirror 121 is a minus angle around the rotational angle of 0°, the non-linear region is used in which the electrostatic capacity is not proportional to the rotational angle. However, in any case, by differentially connecting the LC oscillating circuits 51 and 52 to each other, electrostatic capacities corresponding to the rotational angle can be obtained accurately, and a correction value for the driving signals can be obtained accurately on the basis of the difference between the electrostatic capacities. The processing unit 11 corrects the driving signals output to the D/A converter 12 by using the value output from the output terminal 66 of the electrostatic capacity comparing unit 42 as a correction value.

In the tilt mirror 120, the range in which the angle of the mirror 121 is changed actually includes a range of plus rotational angle θ up to about +3° to 4° and a range of minus rotational angle θ between 0° and about −2°, which is part of the angle range shown in FIG. 26. In particular, in the minus region, the angle range is limited. Like this, in the minus angle range, the relation between the rotational angle and the electrostatic capacity is non-linear, but a range in which quantification is possible is used.

According to embodiment 2 described above, the angle of the tilt mirror is detected by the change of the electrostatic capacity, and the detected value is fed back to correct the driving signal, so that high-accurate angle control can be performed and the residual vibration of the mirror can be eliminated, throughout the angle changing range which is set for the tilt mirror. In particular, in either of the plus angle region and the minus angle region which form the full range of oscillation direction of the tilt mirror, angle control can be performed accurately.

Embodiment 3

Figure 8:
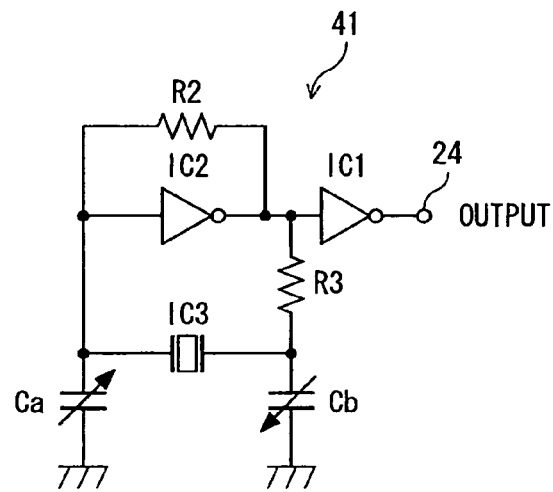
FIG. 8 is a circuit diagram showing another example of configuration of the electrostatic capacity monitoring unit.

Next, embodiment 3 of an optical switch according to the present invention will be described. In embodiment 3, another example of configuration of the mirror-angle detecting unit 14 described in embodiment 1 and embodiment 2 is explained. At first, FIG. 8 is a circuit diagram showing another example of configuration of the electrostatic capacity monitoring unit. The circuit configured as shown in FIG. 8 comprises a quartz resonator IC3, and can be used for the angle control of the tilt mirror 120 shown in FIG. 24. That is, this circuit can be provided instead of the LC oscillating circuits 51 and 52 shown in FIG. 5. Front stage and subsequent stage of the quartz resonator IC3, electrostatic capacities Ca and Cb of the tilt mirror 120 are provided in parallel respectively. When the angle of the mirror is changed, a signal having a resonance frequency corresponding to values of the electrostatic capacities is output from the output terminal 24 by the inversion element (NOT) IC2 and the quartz resonator IC3.

The signal outputted from the output terminal 24 is a sinusoidal wave having a period corresponding to the resonance frequency, and is fed back to the processing unit 11 through a pulse converting unit which is not shown. In such configuration, the mirror-angle detecting unit 14 is able to consist of only the electrostatic capacity monitoring unit 41 constituted as shown in FIG. 8, and the electrostatic capacity comparing unit 42 shown in FIG. 4 is not required. Therefore the processing unit 11 corrects the driving signal to be output to the D/A converter 12 using the phase of the input pulse as a correction value.

Figure 9:
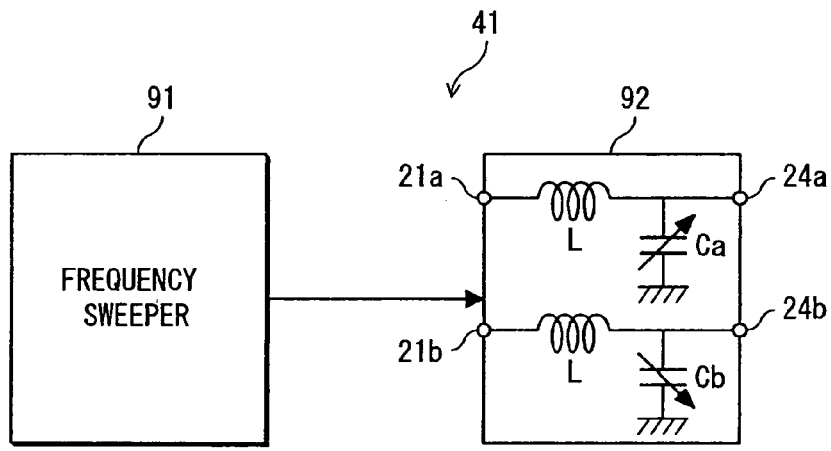
FIG. 9 is a block diagram showing another example of configuration of the electrostatic capacity monitoring unit.

Furthermore, FIG. 9 is a block diagram showing another example of configuration of the electrostatic capacity monitoring unit. The circuit constituted as shown in FIG. 9 is composed of a frequency sweeper 91 and a LC resonance circuit 92, and can be used for angle control of the tilt mirror 120 shown in FIG. 24. That is, this circuit can be provided instead of the LC oscillating circuits 51 and 52. The frequency sweeper 91 scans the frequency of a signal which it has generated, and supplies the scanned frequency to the LC resonance circuit 92. Driving signals are input to the LC resonance circuit 92 through the input terminals 21a and 21b, and predetermined resonance frequencies are obtained by LC resonances of the coils L and the capacitors Ca and Cb. The capacitors C correspond to the electrostatic capacities Ca and Cb of the tilt mirror 120. When the angle of the mirror 121 is changed, a driving signals F1 and F2 of a sinusoidal wave having a period corresponding to the resonance frequency depending on the electrostatic capacities Ca and Cb is output from the output terminals 24a and 24b, by the frequency scanning performed by the frequency sweeper 91. The driving signals F1 and F2 are output to the electrostatic capacity comparing unit 42 through a pulse converting unit which is not shown.

Figure 10:
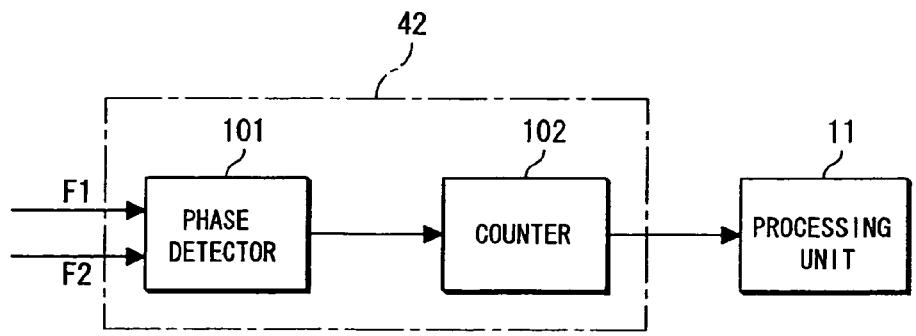
FIG. 10 is a block diagram showing another example of configuration of the electrostatic capacity comparing unit.

Next, FIG. 10 is a block diagram showing another example of configuration of the electrostatic capacity comparing unit. The electrostatic capacity comparing unit 42 shown in FIG. 10 detects, by using a counter, the difference (phase) of the frequencies included in the driving signals F1 and F2 output from the electrostatic capacity monitoring unit 41. The phase detector 101 detects the phase difference between frequencies included in the driving signals F1 and F2, and outputs pulses with a fixed phase difference. The counter 102 counts the number of the pulses outputted from the phase detector 101. The counter 102 outputs a count value corresponding to the phase difference between the driving signals F1 and F2. The count value outputted from the counter 102 is fed back to the processing unit 11. The processing unit 11 corrects the driving signals using the count value as a correction value, and outputs the corrected driving signals to the D/A converter 12 (see FIG. 2).

Figure 11:
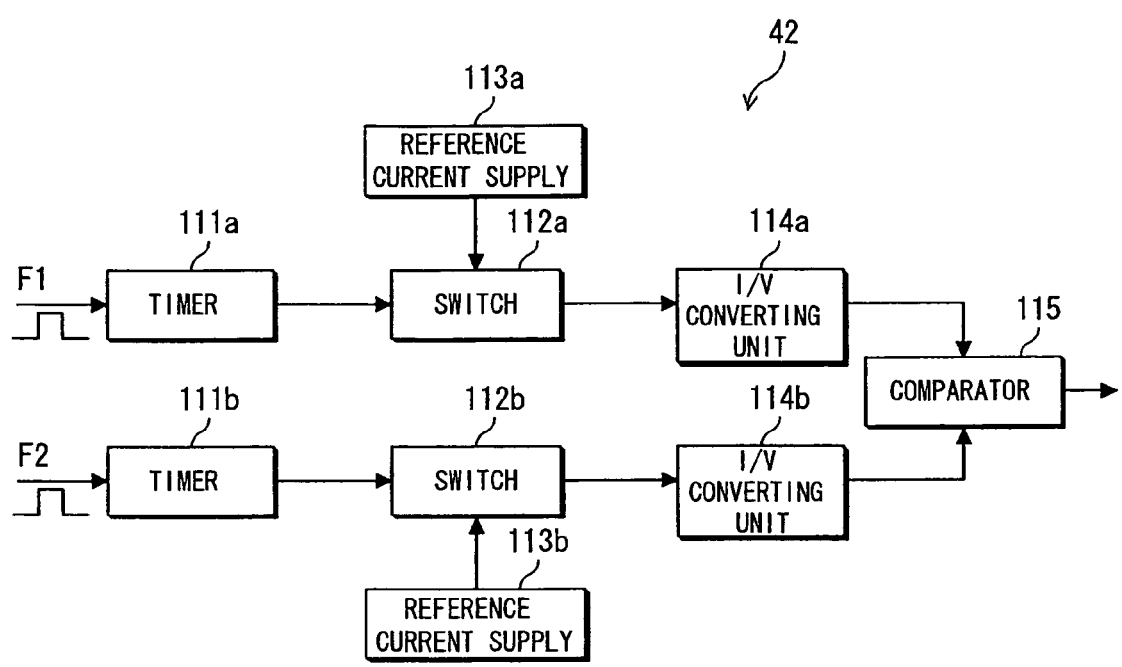
FIG. 11 is a block diagram showing another example of configuration of the electrostatic capacity comparing unit.

Furthermore, FIG. 11 is a block diagram showing another example of configuration of the electrostatic capacity comparing unit. For the electrostatic capacity comparing unit shown in FIG. 11, driving signals F1 and F2 output from the electrostatic capacity monitoring unit 41 are input to the timers 111a and 111b respectively. The timers 111a and 111b form the pulse width of the driving signals F1 and F2 to output them to switches 112a and 112b. The switches 112a and 112b performs changeover control of on/off of the reference current supply 113a and 113b by the formed pulse width. The current whose changeover control is performed by the switches 112a and 112b is input to an IN converting units 114a and 114b and is converted to a voltage. The current (amount of electric charge) flowing into the IN converting units 114a and 114b is proportional to the pulse frequency of the driving signals F1 and F2. The comparator 115 outputs the difference between frequencies of the driving signals F1 and F2 converted to voltages, to the processing unit 11.

Like the embodiment 3 described above, the electrostatic capacity monitoring unit 41 and electrostatic capacity comparing unit 42 constituting the mirror-angle detecting unit 14 can be constituted in various manners, and in any case, the mirror-angle detecting unit 14 is able to detect changes in the electrostatic capacities associated with angle variations of the tilt mirror to output an accurate correction value to the processing unit 11.

According to the optical switch controller described above, the changes in the electrostatic capacities associated with angle variations of the tilt mirror are detected, and a correction value is fed back to the processing unit which outputs driving signals, so that the processing unit is able to correct the driving signals accurately on the basis of the inputted correction value, reduce resonance vibration caused at drive, and control optical changeover accurately.

In each of the embodiments described above, an optical switch composed of a tilt mirror is explained as an example of a movable body to be controlled, and an optical switch constituted so as to control the movement of a minute movable body by using a MEMS technology or the like can be also adopted and is able to perform high-accurate movement control. In particular, by performing feedback control of the tilt of a movable body such as a mirror in order that the tilt of the movable body does not become a predetermined angle (capacity for a self-resonance), residual vibration caused by a self-resonance can be prevented.

Embodiment 4

Next, embodiment 4 of an optical switch according to the present invention will be described.

Figure 12:
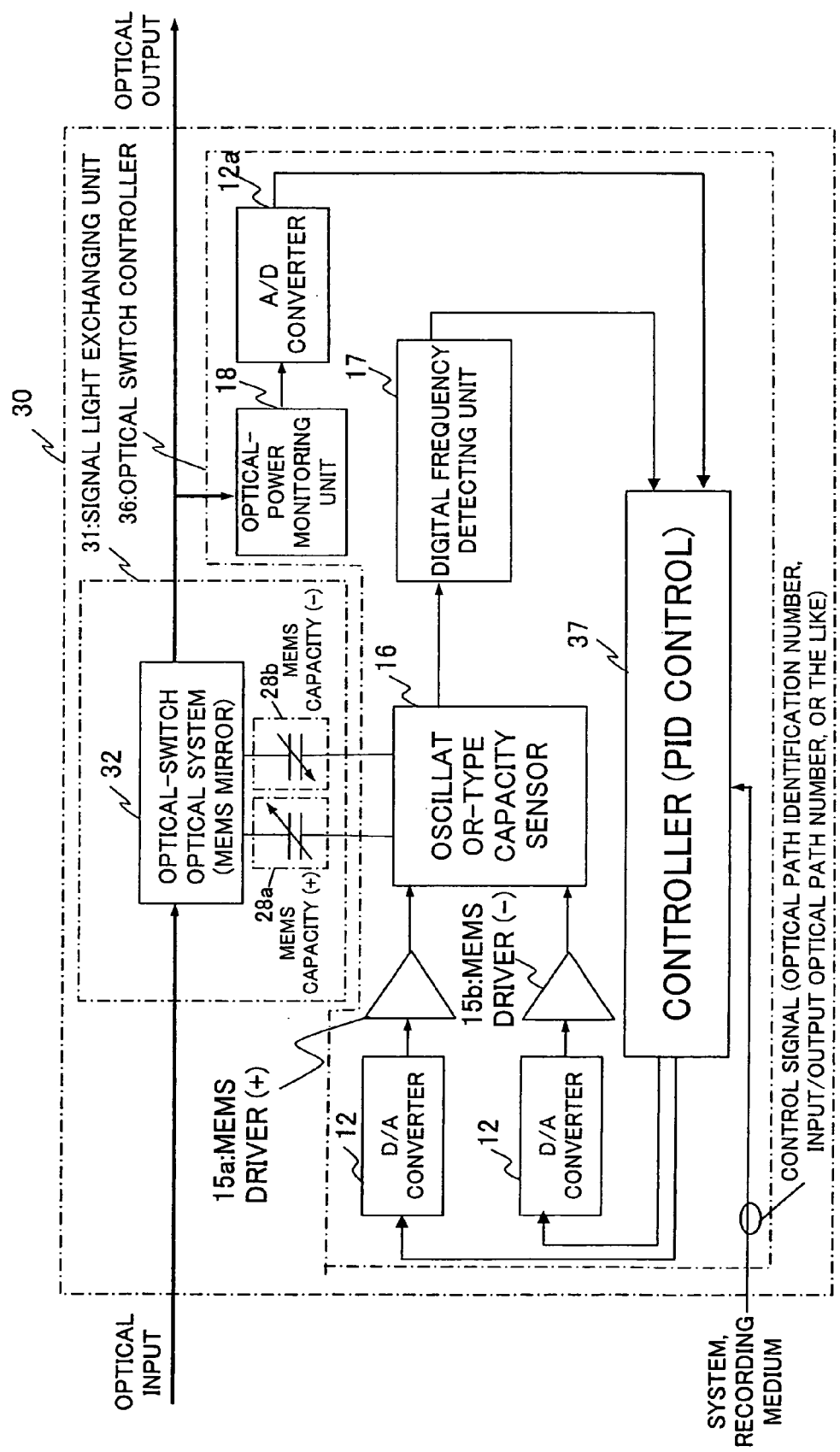
FIG. 12 is a configuration diagram of the optical switch in embodiment 4.

FIG. 12 is a configuration view of the optical switch in embodiment 4. The optical switch 30 shown in FIG. 12 switches the input n-channel (n represents a natural number) single wavelength light every channel, and outputs the switched n-channel single wavelength light to given output channels. That is, the optical switch 30 has a light exchanging function, and switches given signal light λj (j represents 1 to n) of n-channel signal light λ1 to λn on the input ports to n-channel given output ports.

The signal light exchanging unit 31 in the figure exchanges paths of the input signal light to any paths of the output signal to output signal light. The optical switch controller 36 controls angular positions of surfaces of the n mirrors on the basis of electrostatic capacities between the n mirrors provided in the signal light exchanging unit 31 and the driving electrodes to provide driving voltages for the n mirrors, and is composed of an optical switch optical system 32 and electrostatic capacities 28a and 28b.

Figure 13:
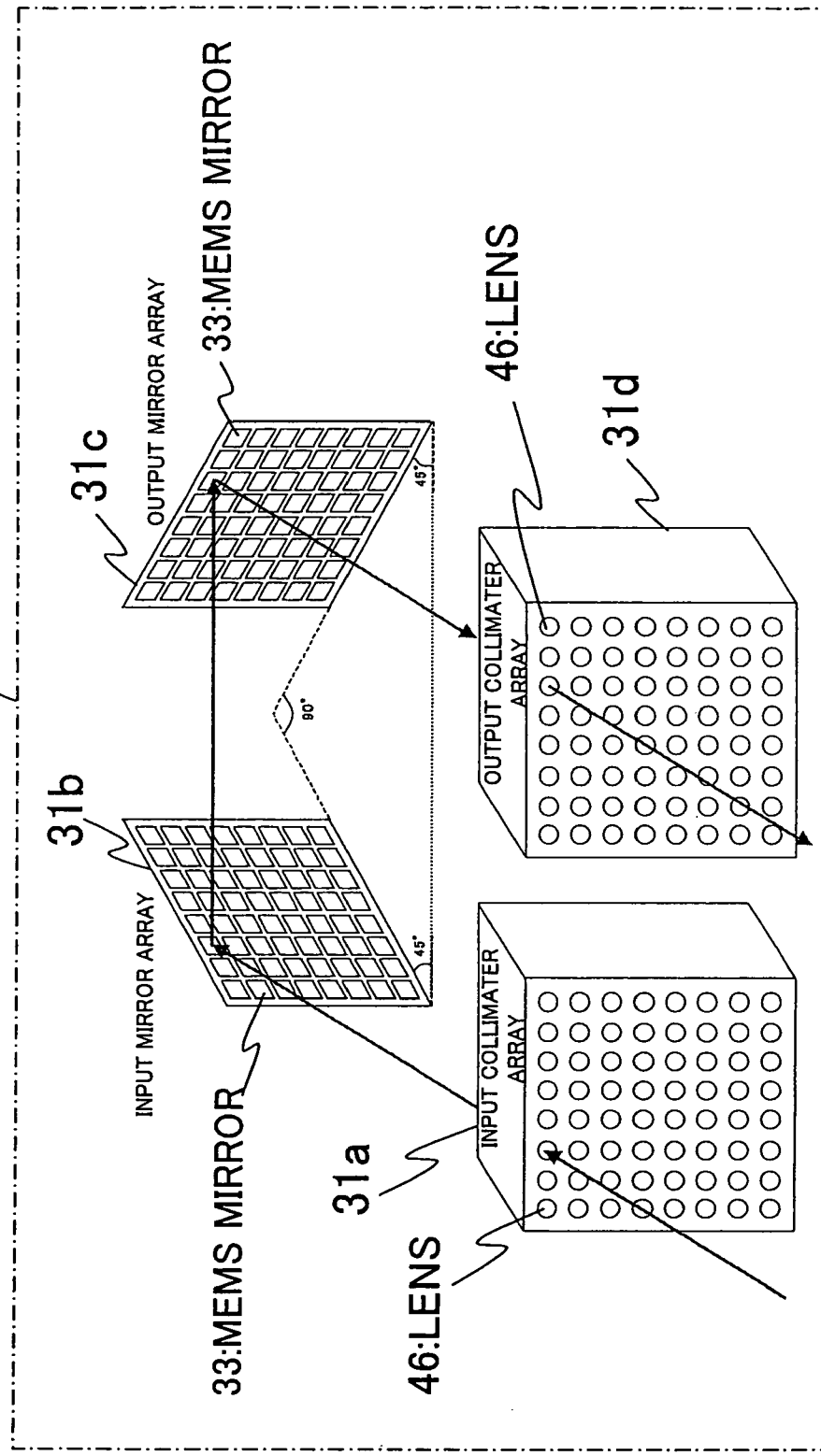
FIG. 13 is a perspective view showing an example of an optical switch optical system.

FIG. 13 is a perspective view showing an example of the optical switch optical system 32. The optical switch optical system 32 shown in FIG. 13 is composed of an input collimator array 31a in which lenses (condenser lenses) 46 to which n-wave signal light is inputted are arranged in the form of an array (lattice), an input mirror array 31b in which n MEMS mirrors (tilt mirror) 33 for reflecting signal light outputted from n lenses 46 of the input collimator array 31a at a predetermined angle are arranged in the form of an array, an output mirror array 31c in which n MEMS mirrors 33 for further reflecting signal light reflected by the n MEMS mirrors 33 of the input mirror array 31b at a predetermined angle are arranged in the form of an array, and an output collimator array 31d in which n lenses 46 for condensing a plurality of signal light reflected by the n MEMS mirrors 33 of the output mirror array 31*c* are arranged in the form of an array.

The angular position of each of the n MEMS mirrors 33 can be changed depending on a set driving voltage, and the angular position of the surface of each of the mirrors can be changed on the basis of the electrostatic capacities between the MEMS mirror 33 and the driving electrodes (not shown). Each of the input mirror array 31*b* and the output mirror array 31*c* is so provided in a standing manner on a virtual line that both of the array surfaces form a right angle, and n MEMS mirrors 33 are provided on each of the array surfaces.

Angles (tilt angles) of the 2n MEMS mirrors 33 are determined on the basis of the tilt-angle setting table (FIG. 16) described later, and the tilt angles can be adjusted dynamically to desired angles by two-axis control. Loss of signal light can be adjusted by shifting a tilt angle from an optimum angle.

When the relation between an input side channel (e.g. 1) and an output side channel (e.g. 176) is represented by (1, 176), in the optical switch optical system 32, for example, signal light on the path (1, 3) is condensed by the input collimator array 31*a*. The condensed signal light is reflected by a MEMS mirror 33 located on the path (1, 3) of the input mirror array 31*b*. The reflected light is reflected by a MEMS mirror 33 located on the path (1, 6) of the output mirror array 31*c*, and is then output from a lens 46 corresponding to the path (1, 6) of the output collimator array 31*d*, thus being output from a port different from the input port. Consequently, the path of the signal light is switched from the path (1, 3) to the path (1, 6).

The structure of the MEMS mirror 33 will be described in more detail.

Figure 14A:
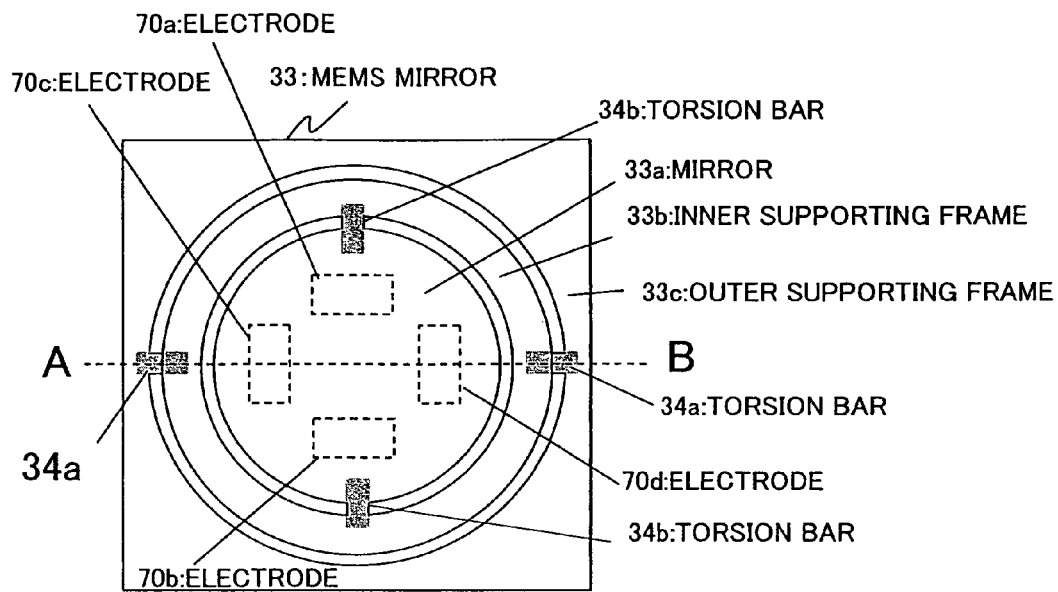
FIG. 14A is a top view of a MEMS mirror in embodiment 4.

FIG. 14A is a top view of the MEMS mirror 33 in embodiment 4. The MEMS mirror 33 shown in FIG. 14A is composed of, a mirror 33*a* shaped like, for example, a circle, a ring-shaped inner supporting frame 33*b*, and an outer supporting frame 33*c* having circular holes made by hollowing it, where the mirror 33*a* is movable by two torsion bars (supporting axes) 34*a* and 34*b*. The mirror 33*a* is attached to the inner supporting frame 33*b* via the torsion bar (first torsion bar) 34*a*, and the right end portion and left end portion of the mirror 33*a* are capable of oscillating around the torsion bar 34*a* in directions, opposite to each other, which are perpendicular to the paper face. The inner supporting frame 33*b* is attached to the outer supporting frame 33*c* via the torsion bar (second torsion bar) 34*b* installed in a direction crossing the installation direction of the torsion bar 34*a* at right angle. The upper end portion and lower end portion of the inner supporting frame 33*b* are capable of oscillating around the torsion bar 34*b* in directions, opposite to each other, which are perpendicular to the paper face.

Electrodes 70*a* to 70*d* are provided under the MEMS mirror 33, and one pair of electrodes 70*a* and 70*b* and the other pair of electrodes 70*c* and 70*d* are two-axis controlled independently. The MEMS mirror 33 is tilted a desired angle, by electrostatic force, to a plus (or minus) electrode to which a driving voltage is applied. The electrodes 70*a* and 70*b* swing for a predetermined distance in a direction perpendicular to the paper surface around the torsion bar 34*a*, and the electrodes 70*c* and 70*d* swing for a predetermined distance in a direction perpendicular to the paper surface around the torsion bar 34*b*.

Furthermore, the mirror 33*a* is capable of swinging in different circumferential directions around center lines of the torsion bars 34*a* and 34*b*, and is capable of keeping a state of having a desired angle of the mirror surface. Therefore amounts of the swings around the center axes of the two torsion bars 34*a* and 34*b* are two-axis controlled independently. The mirror 33*a*, the two torsion bars 34*a* and 34*b*, the inner supporting frame 33*b*, and the outer supporting frame 33*c* are composed of conductive members, which have electrostatic capacities to the ground GND.

In this configuration, the mirror 33*a*, the inner supporting frame 33*b*, and the outer supporting frame 33*c* may be formed in various shapes.

Figure 15:
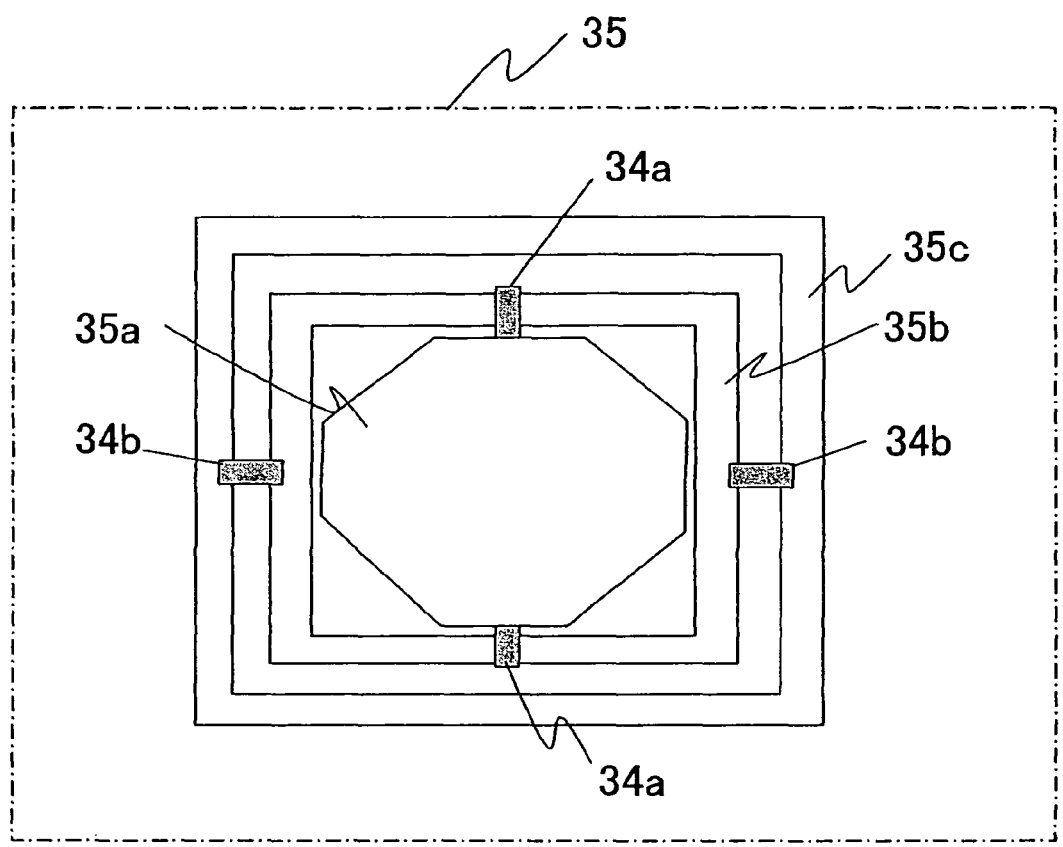
FIG. 15 is a top view of another MEMS mirror in embodiment 4.

FIG. 15 is a top view of another MEMS mirror in embodiment 4. The MEMS mirror 35 shown in FIG. 15 is composed of a mirror 35*a*, an inner supporting frame 35*b*, and an outer supporting frame 35*c* which are similar to the mirror 33*a*, the inner supporting frame 33*b*, and the outer supporting frame 33*c* described above respectively, including torsion bars 34*a* and 34*b*, and is capable of keeping a state of having a desired angle of the mirror surface by two-axis control. All or part of the mirror 35*a*, inner supporting frame 35*b*, outer supporting frame 35*c*, and torsion bars 34*a* and 34*b* are composed of conductive members having electrostatic capacities to the ground GND. On the back of this mirror 33*a*, two pairs of electrodes are provided. Description about the function and operation of the MEMS mirror 35 is omitted because they are similar to those of the MEMS mirror 33 which are described below.

Next, electrostatic capacities of the mirror 33*a* will be explained with reference to FIG. 14B.

Figure 14B:
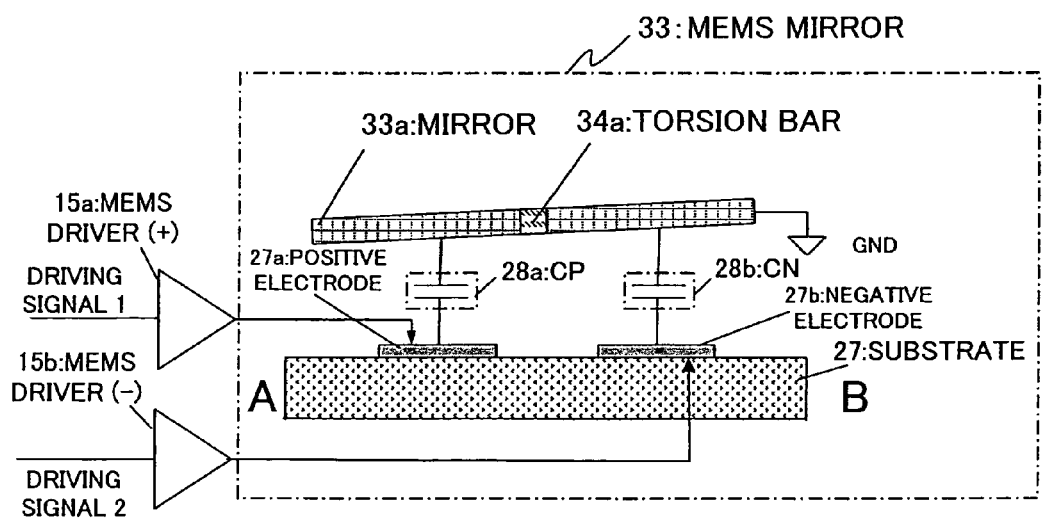
FIG. 14B is a cross-sectional view of a MEMS mirror in embodiment 4.

FIG. 14B is a cross-sectional view of the MEMS mirror in embodiment 4. FIG. 14B is a cross-sectional view taken along the line A-B of FIG. 14A, and shows MEMS drivers 15*a* and 15*b* for reference. The mirror 33*a* shown in FIG. 14B has a substantially flat mirror surface, and is electrically grounded. Under the mirror 33*a*, a substrate 27 is provided. A plus driving electrode (positive electrode) and a minus driving electrode (negative electrode) are provided on the substrate 27, so that an electrostatic capacity CP (28*a* is attached) is generated between the plus driving electrode 27*a* and the mirror 33*a* facing each other, and an electrostatic capacity CN (28*b* is attached) is generated between the minus driving electrode 27*b* and the mirror 33*a* facing each other. Driving voltages output from the plus (+) MEMS driver 15*a* and the minus (−) MEMS driver 15*b* are applied to the plus driving electrode 27*a* and the minus driving electrode 27*b* respectively. Either of the MEMS drivers 15*a* and 15*b* outputs a driving voltage corresponding to an inputted driving signal. The driving signal is input from a controller described below, by which feedback control of the angular position of the mirror 33*a* is performed.

The optical switch controller 36 shown in FIG. 12 is composed of a controller 37 for outputting plus and minus digital driving signals on the basis of a control signal to set an optical path, two D/A converters 12 for converting the driving signals from the controller 37 to analog signals, a plus MEMS driver 15*a* and minus MEMS driver 15*b* for applying driving voltages to the optical switch optical system 32 in the signal light exchanging unit 31 on the basis of the analog driving signals outputted from the D/A converters 12 respectively, an oscillator-type capacity sensor (mirror angle sensor) 16 for outputting oscillation frequencies (digital frequencies: periodic signals) obtained by LC oscillations of internal coils (in the optical switch optical system 32) and electrostatic capacities determined by an angular position of the MEMS mirror (in the optical switch optical system 32), a digital frequency detecting unit 17 for detecting digital frequencies outputted from the oscillator-type capacity sensor 16 and inputting the detected digital frequencies to the controller, an optical-power monitoring unit 18 for monitoring the power of signal light outputted from the optical switch optical system 32, and an A/D converter 12*a* for converting a power value monitored by the optical-power monitoring unit 18 to digital power value data.

The controller 37 has a tilt-angle setting table 45 (FIG. 16) which defines correspondences between input optical paths and output optical paths, and outputs a control signal for optical-path setting on the basis of held data in the tilt-angle setting table 45 when angle setting data is input from a system (e.g. main control unit of a system (not shown)) or the like. Instead of inputting angle setting data, the controller may read held data from a recording medium on which the held data has previously been recorded by an administrator. The control signal for optical path setting includes data such as optical-path identification numbers or input/output optical-path numbers.

In addition, the controller 37 controls the angular position of the mirror by means of proportional plus integral plus derivative (PID) control. This example of definition of PID control is a control method using a combination of three kinds of control actions, a proportional action, an integral action, and a derivative action. The three kinds of control actions are executed in case that there is a deviation between an actual angle of the mirror surface and a target angle of the mirror surface included in a control signal for optical path setting when the controller 37 has adjusted the angle of the mirror surface. These control actions are (1) an action immediately following a variation of the deviation (proportional action), (2) an action continuously performing the control until the actual angle matches the target angle (integral action), and (3) an action performing predictive following corresponding to a future angular position predicted on the basis of the variation of the deviation (rate of change)(derivative action).

FIG. 16 shows an example of a tilt-angle setting table of the controller 37 (FIG. 12, etc.) in embodiment 4. The tilt-angle setting table 45 shown in FIG. 16 holds input port numbers, output port numbers, X-axis control angles X1 and X2, and Y-axis control angles Y1 and Y2 which are associated with each other. For example, when the input port and the output port are (1, 3) and (1, 6) respectively, the X-axis of the input side mirror and the X-axis of the output side mirror are plus X1 degrees and plus X2 degrees respectively, and the Y-axis of the input side mirror and the T-axis of the output side mirror are minus Y1 degrees and minus Y2 degrees respectively. The two-axis control information is notified, and the driving voltages are increased or reduced on the basis of the control information.

For the oscillator-type capacity sensor 16 shown in FIG. 12, a Colpitts-type LC oscillating circuit 20 shown in FIG. 3 may be used. The capacity variable capacitor Ca shown in FIG. 3 generates LC oscillation together with the coils (inductors) L2 and L1, etc.

Figure 17:
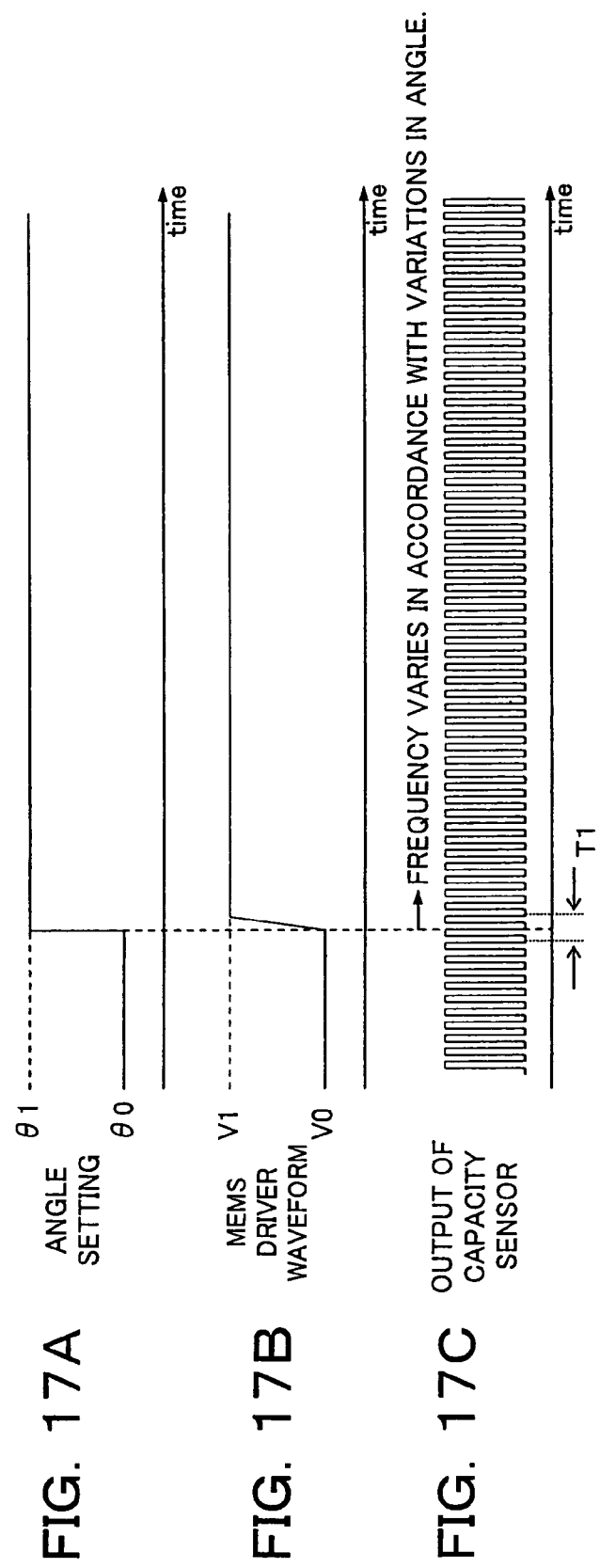
FIGS. 17A to 17C are timing charts depicting operations of the MEMS driver and oscillator-type capacity sensor in embodiment 4.

FIGS. 17A to 17C are timing charts depicting operations of the MEMS drivers 15*a* and 15*b* and oscillator-type capacity sensor (indicated as a capacity sensor) 16 in embodiment 4. When the MEMS drivers 15*a* and 15*b* are notified an angle set value θ1 shown in FIG. 17A by the controller 37, they output analog voltage V1 shown in FIG. 17B.

Due to the LC oscillation, a sinusoidal wave (meaning also a cosine wave) having an oscillation frequency corresponding to a tilt angle of the MEMS mirror 33*a* is output from the output terminal 24 (FIG. 3, etc). This output is an output of the capacity sensor shown in FIG. 17C, and is shown as a pulse-like wave for simplification. This oscillation frequency changes with variations of the angle. This sinusoidal wave functions as a periodic signal of the present invention.

The outputted sinusoidal wave may be input to an element (e.g. comparator) outputting [1] or [0], when a wave having a level more or less than a predetermined threshold is input, to be shaped to a pulse having a predetermined width.

As a periodic signal, a wave such as a triangular wave may be used whose periodical on/off can be detected by the digital frequency detecting unit 17 provided subsequent stage of the oscillator-type capacity sensor 16 (FIG. 12).

Figure 18:
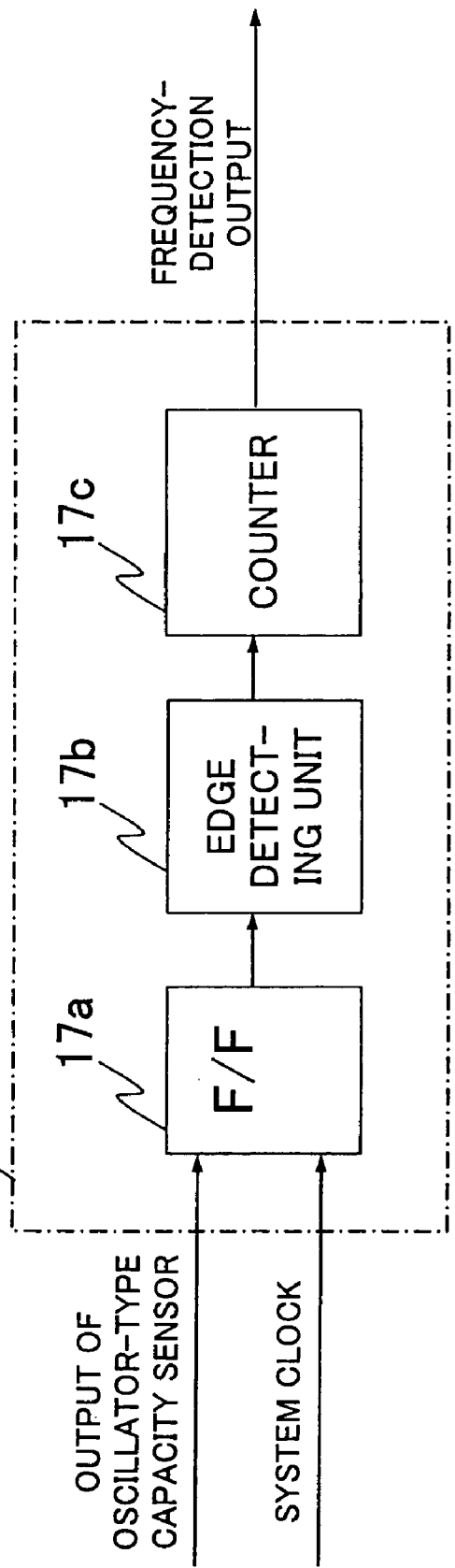
FIG. 18 is a block diagram of the digital frequency detecting unit in embodiment 4.

FIG. 18 is a block diagram of the digital frequency detecting unit 17 in embodiment 4. The digital frequency detecting unit 17 is composed of a flip-flop (F/F) 17*a*, an edge detecting unit 17*b*, and a counter 17*c*. The flip-flop 17*a* updates a binary state of 1 or 0 by a periodic signal output from the oscillator-type capacity sensor 16 (FIG. 12), and functions as a multi-value state holding unit to hold periodic signal data input from the oscillator-type capacity sensor 16. The held periodical signal data is read with the timing of a high speed system clock.

The multi-value state holding unit (not shown) may use a logical element, for example, composed of a plurality of flip-flops 17*a* for holding a binary state a three or more-value state.

Figure 19:
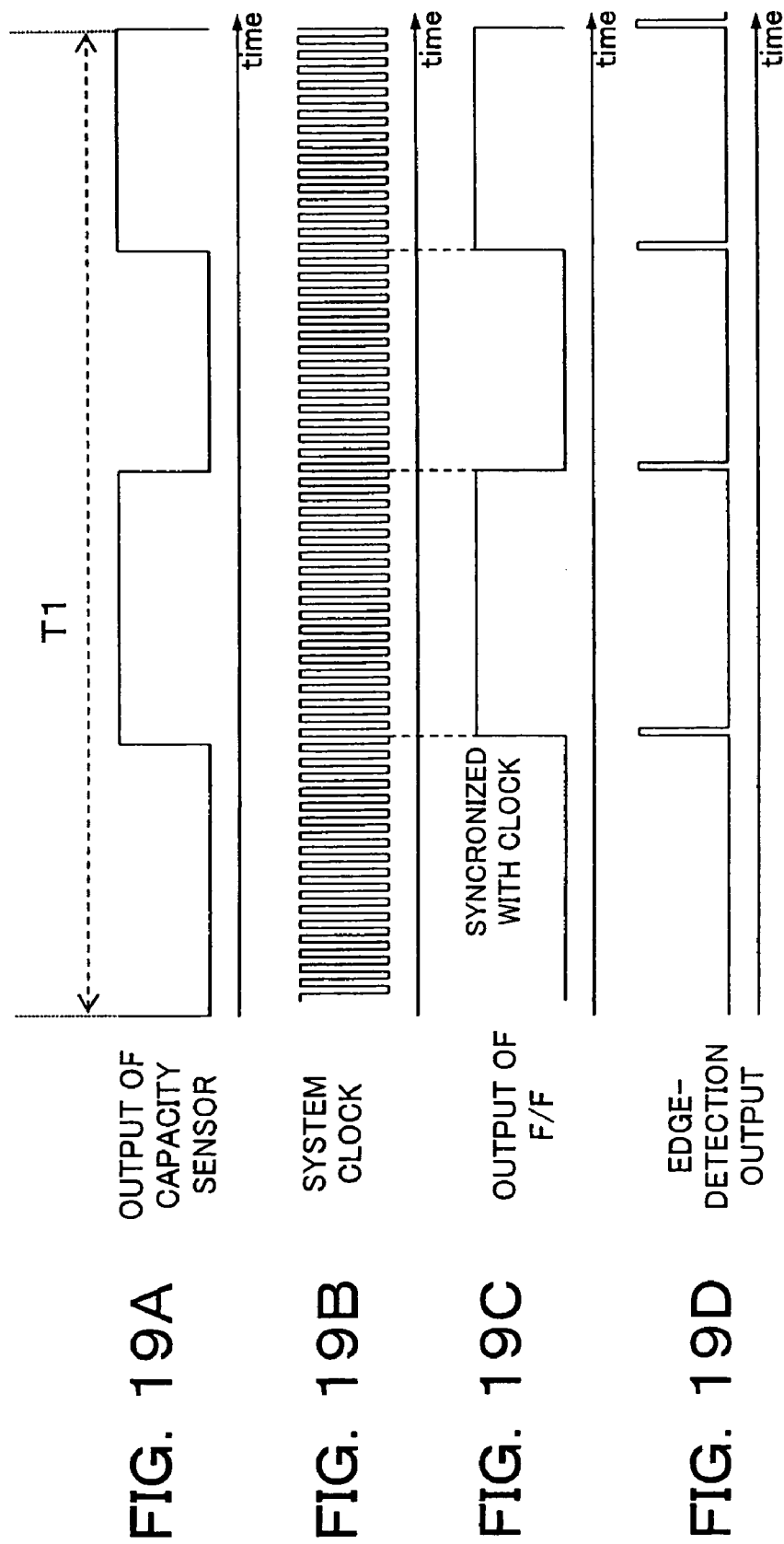
FIGS. 19A to 19D are timing charts depicting an operation of the digital frequency detecting unit in embodiment.

FIGS. 19A to 19D are timing charts depicting operations of the digital frequency detecting unit 17 in embodiment 4. The output signal of the oscillator-type capacity sensor 16 shown in FIG. 19A is on and off at a predetermined frequency, and the system clock wave shown in FIG. 19B has an extremely short period as compared with the speed of the output of the oscillator-type capacity sensor 16. The output wave of the oscillator-type capacity sensor 16 shown in FIG. 19A is an enlarged one of the portion in the period T1 of the output wave of the oscillator-type capacity sensor 16 shown in FIG. 17C.

The wave of the flip-flop (F/F: binary-state holding unit) shown in FIG. 19C synchronizes with the system clock.

Furthermore, the edge detecting unit 17*b* shown in FIG. 18 detects variations of the binary state of the flip-flop 17*a* by using a system clock faster than the periodical signal, and functions as a multi-value state detecting unit. The edge detecting unit 17*b* detects leading edges or trailing edges of the output of the flip-flop 17*a*, and counts the number of pulses of the output, thereby detecting a frequency equal to that of the periodic signal of the output of the capacity sensor (FIG. 19A). The period T1 of the output signal of the oscillator-type capacity sensor reference to FIG. 19A.

The digital frequency detecting unit 17 and the controller 37 are preferably integrated on a semiconductor chip, and hence miniaturization of chip can be achieved.

Thus, the optical switch controller 36 of the present invention is composed of the oscillator-type capacity sensor (mirror angle sensor) 16 for outputting a periodic signal (digital frequency) changing depending on angular positions of the mirror, the digital frequency detecting unit (signal period detector) 17 for detecting the period of the periodic signal output from the oscillator-type capacity sensor 16, and the controller 37 for controlling the angular position of the mirror 33*a* (FIG. 14B, etc.) on the basis of the period detected by the digital frequency detecting unit 17.

According to the optical switch controller 36, analog signal processing executed by, for example, the A/D converter 12*a*, etc. becomes unnecessary, and all processing become digital signal processing. Thus, circuit scale reduction and circuit integration become possible, which allows the capacity of the optical switch 30 to be significantly increased.

The operation of the optical switch controller 36 of the present invention configured like that will be described with reference to FIG. 20.

Figure 20:
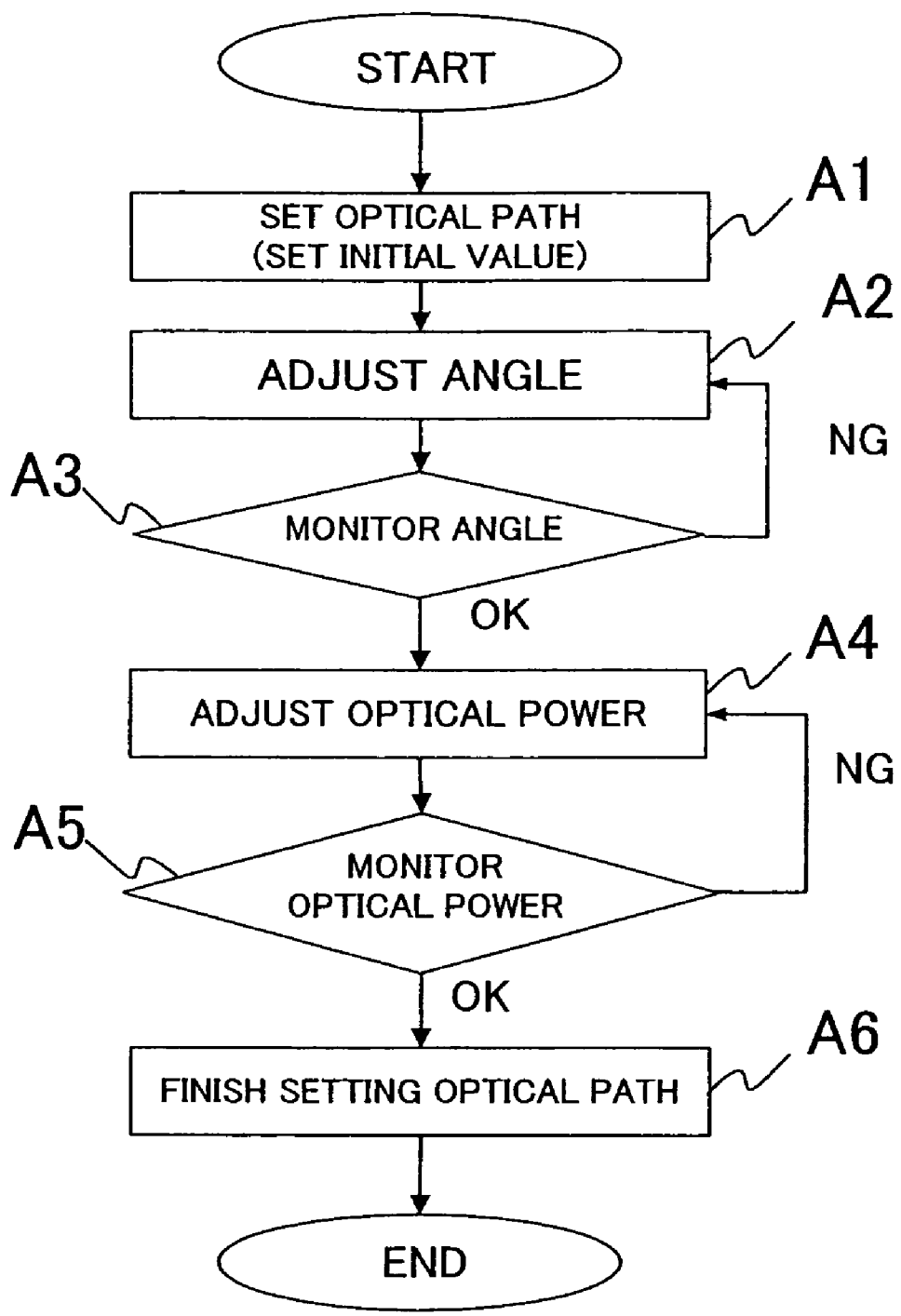
FIG. 20 is a flow chart depicting an operation of the optical switch controller in embodiment 4.

FIG. 20 is a flow chart depicting the operation of the optical switch controller 36 in embodiment 4. The controller 37 of the optical switch controller 36, at first, sets an initial value of the optical path (step A1), and then starts angle adjustment (step A2). This adjustment is performed while referring a monitor value from the oscillator-type capacity sensor 16, and the angle adjustment and angle monitoring are repeated while passing the NG flow until the angular position becomes the optical path set value. When it is detected that the angular position has become the optical path set value, angle adjustment in step A3 is finished.

After that, the controller 37 passes the OK flow and then starts optical power adjustment (step A4). The adjustment is continued while passing the NG flow until the optical power value becomes the set value (step A5). When the optical power value has become the set value, the operation passes the OK flow of step A5, and finishes the optical path setting (step A6).

Like this, feedback control by the angle sensor (oscillator-type capacity sensor 16) is performed, and therefore angle control of about 0.1° to 0.01° becomes possible as a case that conventional technology is used, and shift amount caused by a temperature variation in the optical switch optical system 32 can be corrected dynamically and automatically.

Furthermore, like this, feedback control and optical feedback by the oscillator-type capacity sensor 16 are performed in the optical switch optical system 32.

The optical switch controller 36 in embodiment 4 is always capable of performing feedback control from the oscillator-type capacity sensor 16 (mirror-angle detecting unit) to the controller 37 in contrast to a typical optical switch controller 36.

Here, the present invention will be compared with a conventional technology.

Figure 21A:
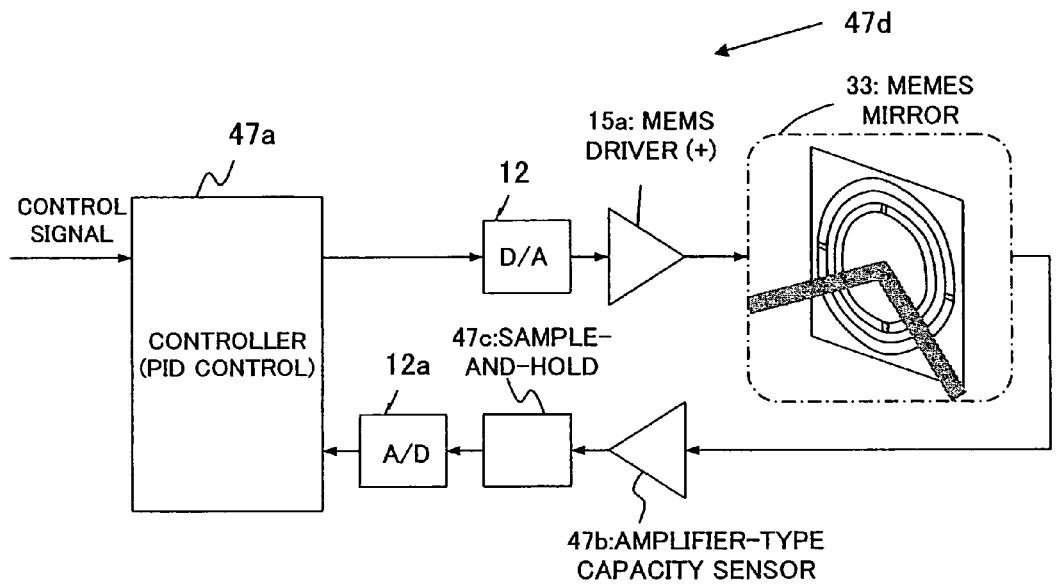
FIG. 21A is a block diagram of a typical optical switch controller.

FIG. 21A is a block diagram of a conventional optical switch controller. The electrostatic capacity sensor (e.g. amplifier-type capacity sensor) 47b of the optical switch controller 47d shown in FIG. 21A detects the angular position of the mirror 33a, and then a detection signal is converted to a digital signal through the sample-and-hold circuit 47c and the A/D converter 12a to be input to the controller 47a.

Figure 21B:
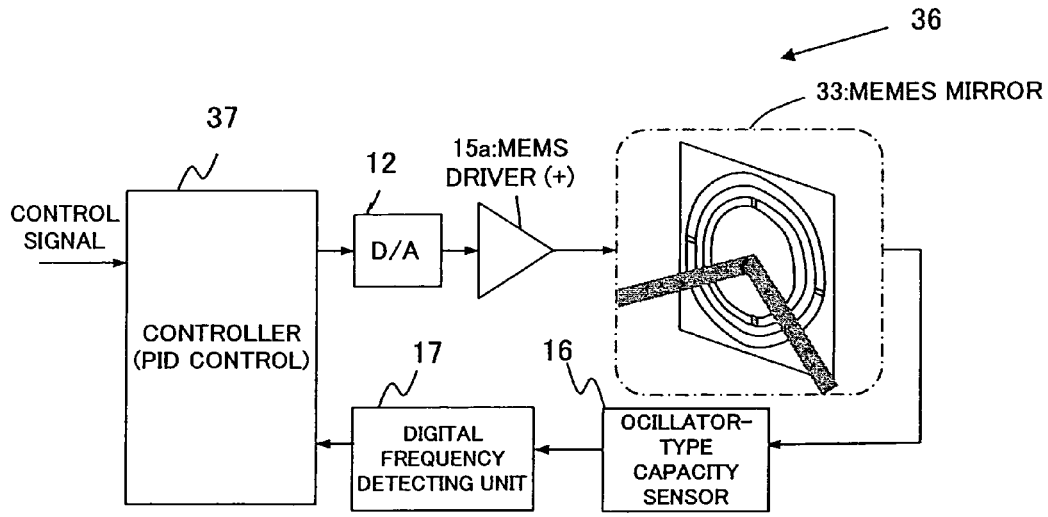
FIG. 21B is a block diagram of an optical switch controller according to the present invention.

On the other hand, FIG. 21B is a block diagram of an optical switch controller 36 according to the present invention. The optical switch controller 36 shown in FIG. 21B is composed of an oscillator-type capacity sensor (oscillator-type capacity sensor circuit, electrostatic capacity monitoring means) 16, and a digital frequency detecting unit (digital frequency detecting circuit, electrostatic capacity detection means) 17, wherein all of the feedback control components from the mirror-angle detecting unit (oscillator-type capacity sensor 16) to the controller 37 are digitized.

Because of this, in the A/D converter 12a and the D/A converter 12, analog signal processing is not executed, and hence the same function as the conventional technology is realized. Thus, according to the present invention, circuit scale reduction and circuit integration become possible, which allows the scale of the optical switch 30 to be increased.

Like this, the invention associated with embodiment 4 is capable of exchanging light from n input ports to given ports to output the light. In addition, this invention reflects single wave light separated from input WDM light at the input mirror array 31b (see FIG. 13) and the output array 31c in sequence, and then outputs the single light from the output port.

Embodiment 5

In contrast to an electromagnetic drive type MEMS mirror, an oscillator-type inductance sensor may be used as a mirror-angle detecting unit.

Figure 22A:
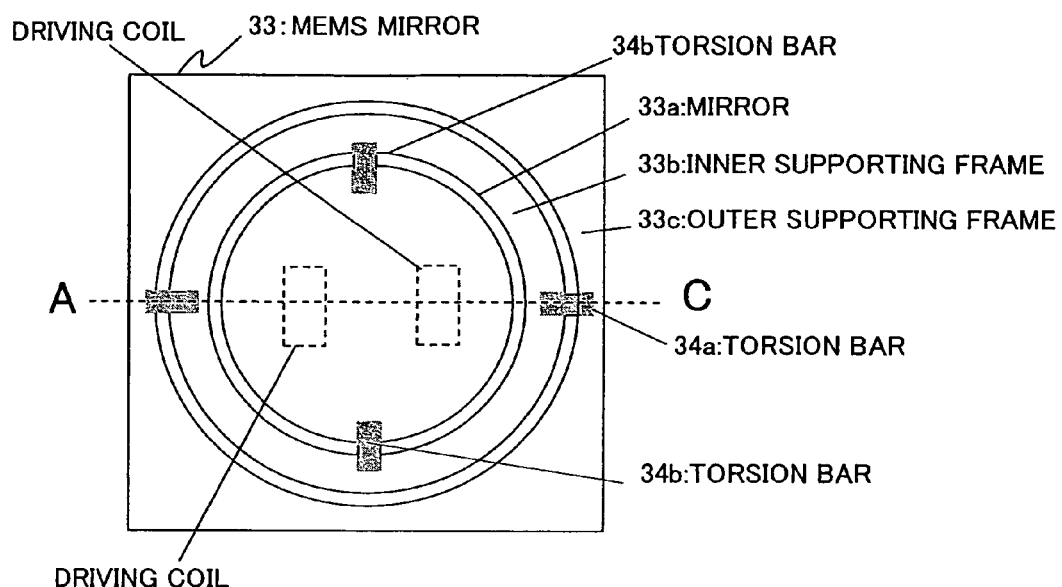
FIG. 22A is a top view of the MEMS mirror in embodiment 5.

The top surface of the mirror in embodiment 5 has, for example, a shape as shown in FIG. 22A, which is similar to that shown in FIG. 14A, and hence duplicate explanation is omitted.

Figure 22B:
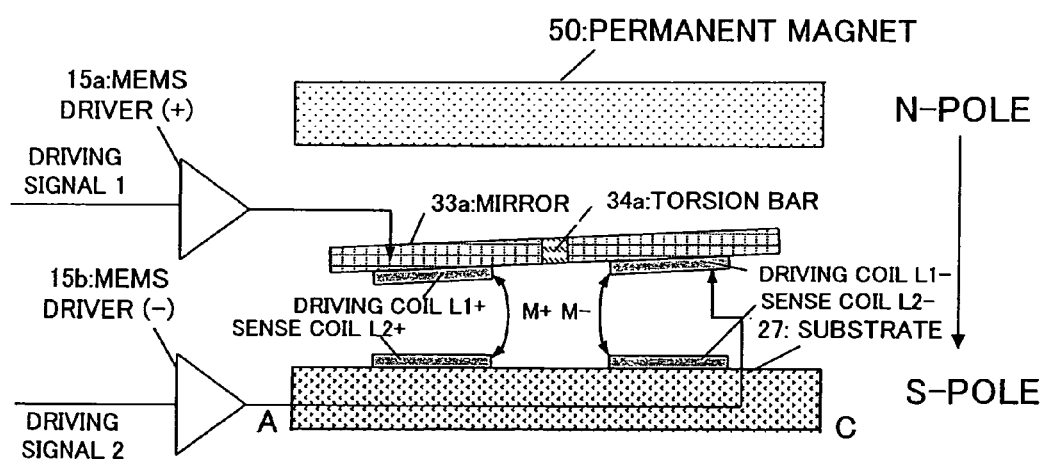
FIG. 22B is a cross-sectional view of the MEMS mirror in embodiment 5.

FIG. 22A is a top view of the MEMS mirror in embodiment, and FIG. 22B is a cross-sectional view of the MEMS mirror taken along the line AC in FIG. 22A. A permanent magnet (magnet) 50 shown in FIG. 22B is provided above the mirror 33a, and two pairs of electrodes are provided on the back of the mirror 33a. A configuration example in case that the bottom end of the permanent magnet 50 is an N pole is shown. In this configuration, magnetic flux density B is generated downward and vertically from the bottom end of the permanent magnet 50. In other word, the strength H of the magnetic field is large at the permanent magnet 50 side, and is small at the substrate 27 side.

Driving coils 38a and 39a are mounted on the substrate 27 side surface of the mirror 33a, and sense coils 38b and 39b are formed on the mirror 33a side surface of the substrate 27. The driving coil 38a and the sense coil 38b have self-inductances L1+ (L1 plus) and L2+ respectively, and the driving coil 39a and the sense coil 39b have self-inductances L1− (L1 minus) and L2− respectively. When low frequency alternating currents becoming driving signals flow in the driving coils, the driving coils generate electromagnetic force according to the magnetic flux density B generated by the permanent magnet 50, thus tilting the mirror. The sense coils have mutual inductances M, which change according to the angle of the mirror, between the sense coils and the driving coils, and perform angle sensing by detecting the mutual inductances.

Figure 23:
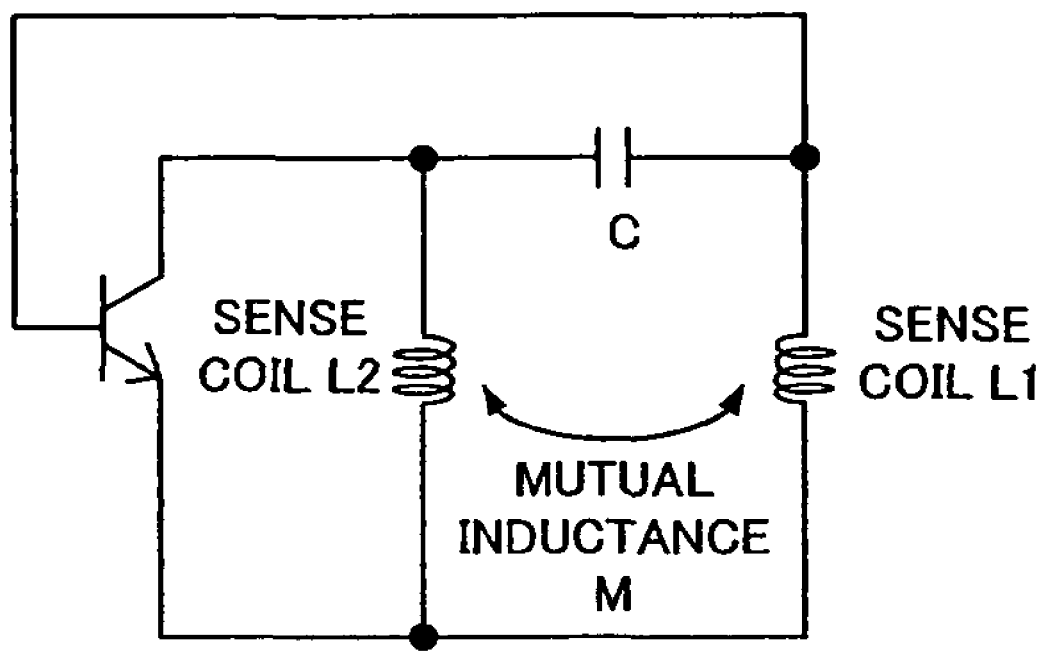
FIG. 23 is a circuit diagram showing a specific example of configuration of the mirror-angle detecting unit in embodiment 5.

FIG. 23 is a circuit diagram showing a specific example of configuration of the mirror-angle detecting unit in embodiment 5.

The mirror-angle detecting unit 14 shown in FIG. 23 operates as a Hartley-type oscillating circuit. Specifically, the mirror 33a functions as an oscillator-type inductance sensor to obtain an oscillation frequency. The mutual inductance M between the driving coil and the sense coil shown in FIG. 22 changes by angle change, and hence an oscillation frequency w given by equation (3) is output.

$$\omega^2 = \sqrt{\frac{1}{(L_1 + L_2 + 2M) * C}} \quad (3)$$

In this connection, the bottom end of the permanent magnet 50 may be an S pole. Methods of generating magnetic flux density B include a method of feeding steady-state current through an electric wire or conductive bar provided, in parallel with the two sense coils, on the backside of the paper, the current being fed from the left to the right of the paper, a method of feeding current through a solenoid coil (not shown) provided in such a manner that the center axis of it is directed in the vertical direction of the mirror, and the like.

Like this, a mirror angle sensor may be configured using an oscillator-type inductance sensor changing a periodic signal according to inductance changes caused by variations of the angular position of the mirror 33a.

What is claimed is:

1. An optical switch controller performing angle control of a mirror, the optical switch controller comprising:
   a mirror angle sensor to output a periodic signal, wherein a period of the periodic signal changes according to a change of an angular position of said mirror;
   a signal period detector to detect the period of the periodic signal outputted from said mirror angle sensor; and a controller to control the angular position of said mirror based on the period detected by said signal period detector, wherein the mirror angle sensor includes an oscillator-type electrostatic capacity sensor which changes the period of the periodic signal depending on variations of an electrostatic capacity caused by changes of the angle position of said mirror.

2. An optical switch controller according to claim 1, wherein said signal period detector further comprises:

a multi-value state holding unit to hold a multi-value state by the periodic signal outputted from said mirror angle sensor; and a state detecting unit to detect changes in the multi-value state of said multi-value state holding unit by using a system clock faster than said periodic signal.

3. An optical switch controller according to claim 1, wherein said signal period detector and said controller are integrated on the same semiconductor chip.

4. An optical switch controller according to claim 1, wherein said mirror angle sensor includes an oscillator-type electrostatic capacity sensor which changes said periodic signal depending on variations of an electrostatic capacity caused by changes of the angular position of said mirror.

5. An optical switch controller according to claim 1, wherein said mirror angle sensor includes an oscillator-type inductance sensor which changes said periodic signal depending on variations of an inductance caused by variations of the angular position of said mirror.

6. An optical switch controller performing angle control of a mirror, the optical switch controller comprising:

means for outputting a periodic signal whose period changes according to a change of an angular position of said mirror;

means for detecting the period of the outputted periodic signal; and means for controlling the angular position of said mirror based on the detected period, wherein the means for outputting the periodic signal includes an oscillator-type electrostatic capacity sensor which changes the period of the periodic signal depending on variations of an electrostatic capacity caused by changes of the angle position of said mirror.

* * * * *

UNITED STATES PATENT AND TRADEMARK OFFICE
CERTIFICATE OF CORRECTION

| | | |
|---|---|---|
| PATENT NO. | : 8,083,361 B2 | Page 1 of 1 |
| APPLICATION NO. | : 12/654430 | |
| DATED | : December 27, 2011 | |
| INVENTOR(S) | : Satoshi Ide et al. | |

It is certified that error appears in the above-identified patent and that said Letters Patent is hereby corrected as shown below:

Column 1, Line 10 Delete "10/991,626filed" and insert -- 10/991,626, filed --, therefor.

Signed and Sealed this
Thirteenth Day of March, 2012

David J. Kappos
*Director of the United States Patent and Trademark Office*